(12) United States Patent
Murrell et al.

(10) Patent No.: US 11,044,323 B2
(45) Date of Patent: Jun. 22, 2021

(54) METHODS AND APPARATUS FOR MANAGING RISK IN DIGITAL COMMUNICATIONS OF THE INDUSTRIAL INTERNET OF THINGS

(71) Applicants: Stephen Murrell, Miami, FL (US); Henry Hamman, Sewannee, TN (US)

(72) Inventors: Stephen Murrell, Miami, FL (US); Henry Hamman, Sewanee, TN (US)

( * ) Notice: Subject to any disclaimer, the term of this patent is extended or adjusted under 35 U.S.C. 154(b) by 0 days.

(21) Appl. No.: 16/725,712

(22) Filed: Dec. 23, 2019

(65) Prior Publication Data
US 2020/0145501 A1 May 7, 2020

Related U.S. Application Data

(63) Continuation-in-part of application No. 16/261,247, filed on Jan. 29, 2019, now abandoned.

(60) Provisional application No. 62/624,018, filed on Jan. 30, 2018.

(51) Int. Cl.
| | |
|---|---|
| *H04L 29/00* | (2006.01) |
| *H04L 29/08* | (2006.01) |
| *G06F 9/455* | (2018.01) |
| *H04L 29/06* | (2006.01) |
| *H04L 9/32* | (2006.01) |

(52) U.S. Cl.
CPC ........ *H04L 67/141* (2013.01); *G06F 9/45558* (2013.01); *G06F 2009/45562* (2013.01); *H04L 9/3268* (2013.01); *H04L 63/0272* (2013.01); *H04L 63/0428* (2013.01); *H04L 2209/38* (2013.01); *H04L 2209/64* (2013.01)

(58) Field of Classification Search
CPC .............. H04L 67/141; H04L 63/0428; H04L 12/4641; G06F 9/45558; G06F 2009/45562
See application file for complete search history.

(56) References Cited

U.S. PATENT DOCUMENTS

| | | | | |
|---|---|---|---|---|
| 2008/0196043 A1* | 8/2008 | Feinleib | .............. | G06F 11/0712 719/319 |
| 2014/0232524 A1‡ | 8/2014 | Nakai | ..................... | B60R 25/24 340/5.61 |
| 2014/0307873 A1‡ | 10/2014 | Park | ....................... | H04W 12/04 380/270 |
| 2016/0050199 A1‡ | 2/2016 | Ganesan | .................. | G06F 21/31 726/7 |
| 2016/0315923 A1* | 10/2016 | Riscombe-Burton | ........................ H04L 63/18 | |
| 2017/0272316 A1* | 9/2017 | Johnson | ............... | G06Q 10/103 |

(Continued)

*Primary Examiner* — Jeffrey C Pwu
*Assistant Examiner* — Helai Salehi
(74) *Attorney, Agent, or Firm* — Rogers Towers, P.A.; Joseph P. Kincart

(57) ABSTRACT

Apparatus and methods of operation of the apparatus that create a virtual machine and enable an Agent within the virtual machine to another Agent via a digital communications network and establish a communication channel for logical communications via the digital communications network. Communications transmitted and received according to the present invention proceed directly from a PeN agent to a second Agent without any storage or recordation of the transaction on an intermediate server. In some embodiments, the digital communications according to the present invention remain essentially imperceptible to network operators.

18 Claims, 35 Drawing Sheets application programming interface

(56) References Cited

U.S. PATENT DOCUMENTS

2017/0359314 A1‡ 12/2017 Mathias .............. H04L 63/0428
2018/0270052 A1‡ 9/2018 Cullen ................. H04L 9/0822
2020/0145501 A1* 5/2020 Murrell ................ H04L 51/046

\* cited by examiner
‡ imported from a related application

FIG. 3 application programming interface

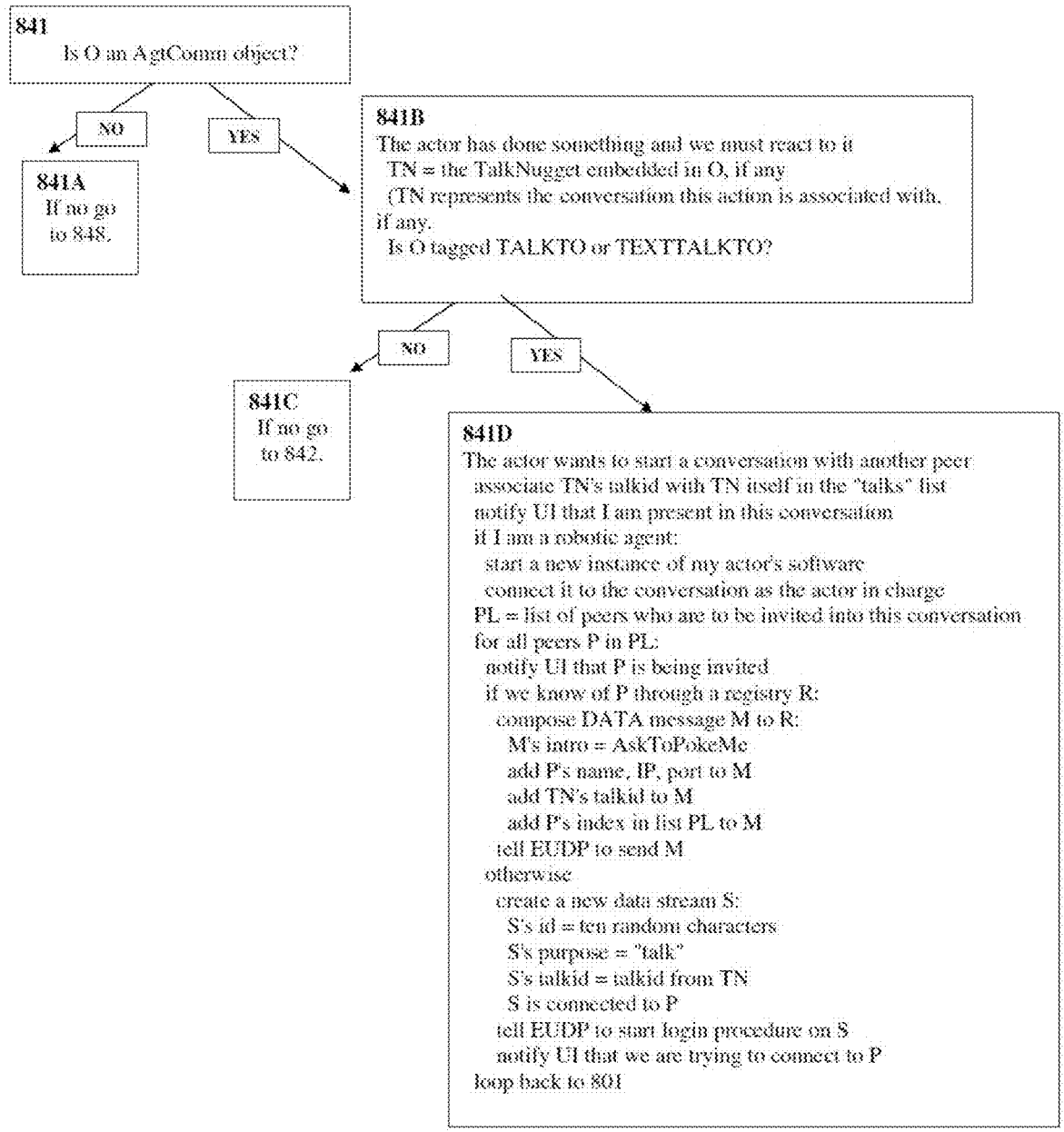

847
Report an error: unrecognised AgtComm message format
loop back to 801

FIG. 8AK

848
Is O a GUIEvent object?

NO → 848A If no go to 849.

YES → 848B
They hit the close control at the top right of the main window
remove the GUI
shut down the system
EXIT

FIG. 8AL

849
report an error: unrecognised GUIEvent message format
loop back to 801

FIG. 8AM

850
report an error: unrecognised message format
loop back to 801

FIG. 8AN

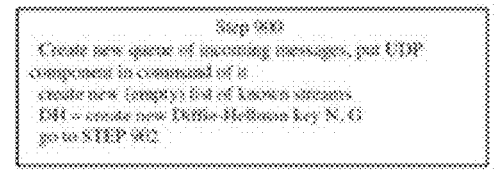

FIG. 9A

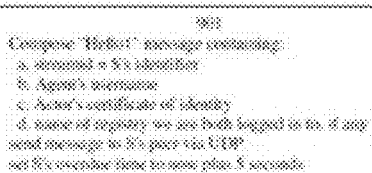

FIG. 9B

FIG. 9C

```
                              STEP 903
if i >= number of known streams, go to Step 908
  S = known stream [i]
  if S is overdue, go to Step 906
  O = object at front of S's to-send queue
  if O is a UDPComm "TERMINATE" object:
    remove S from list of known streams
    invalidate S
    go to STEP 905
  if O's times-sent = 0: (new message, first attempt to deliver
    increment S's last-data-sent
    set O's sequence number to S's last-data-sent
    set S's ackdue time to now plus 5 seconds
    increment S's ackdue count
    go to Step 907
  if S's ackdue time has expired: (acknowledgement of last-sent
  message is overdue
    notify UI of potential problem
    go to Step 907
```

FIG. 9D

STEP 905
increment i
go to STEP 903

FIG. 9E

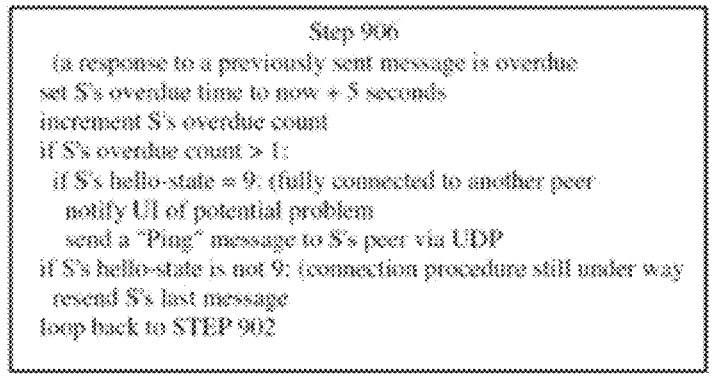

Step 906
(a response to a previously sent message is overdue
set S's overdue time to now + 5 seconds
increment S's overdue count
if S's overdue count > 1:
  if S's hello-state = 9: (fully connected to another peer
    notify UI of potential problem
    send a "Ping" message to S's peer via UDP
  if S's hello-state is not 9: (connection procedure still under way
    resend S's last message
loop back to STEP 902

FIG. 9F

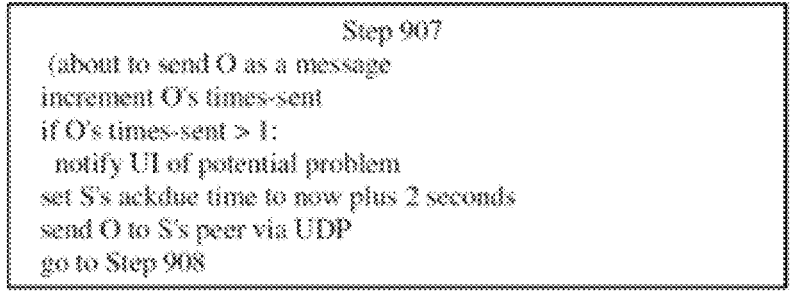

Step 907
(about to send O as a message
increment O's times-sent
if O's times-sent > 1:
  notify UI of potential problem
set S's ackdue time to now plus 2 seconds
send O to S's peer via UDP
go to Step 908

FIG. 9G

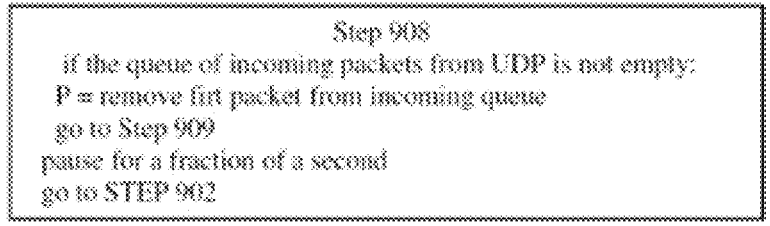

Step 908
if the queue of incoming packets from UDP is not empty:
  P = remove first packet from incoming queue
  go to Step 909
pause for a fraction of a second
go to STEP 902

FIG. 9H

```
Step 909
   (deal with packet P, just arrived via UDP
M = message extracted from packet P
S = stream associated with M's streamid in list of known
streams
   if S is known, go to Step 911
   is M a Hello1 message? if no go to
     yes: (someone is initiating a connection with us
     P1 = look up the peer associated with M's user and registry
names
        in the agent's "knowns" list
     if P1 is null:
       P1 = create a new peer to represent M's sender
     S = create a new stream connected to this peer
     add S to the list of known streams
     notify UI that the connection process is beginning
     set S's N and G = DH's N and G
     S's X and Y = random integers same size as G
     S's sid (stream id) = stream id from M
     S's altsid (alternative stream id) = random string same length
as that in M
     S's otherpub = RSA public key from M's certificate
     X = interleave characters of S's sid and S's altsid
     Code = RSA encrypt X using actor's private key
     compose Hello2 message M2:
        sid = S's sid
        include own username, IP, and port
        include actor's certificate of identity
        include Code
     set S's hello state to 2
     set S's overdue time to now plus 5 seconds
     send M2 to S's peer via UDP
     go to STEP 902
```

FIG. 9I

```
Step 910
(non-Hello1 message received on previously non-existent
stream
   if M is a Hello2 message go to STEP 902 (ignore it
   if M is a Poke message go to STEP 902 (ignore it
   create a new temporary stream S to M's sender
   compose an Off message M2 (say "go away"
   send M2 to S's peer via UDP
   terminate S
   go to STEP 902
```

FIG. 9J

```
Step 914
is M a Hello2 message? if no go to Step 915
yes: (first response to our attempt to make a connection
if S's hellostate is neither 1 nor 3: go to Step 913
send to agent a UDPComm message tagged YOUARE,
  containing IP and port from M
notify UI of good progress
S's otherpub = RSA key from M's certificate
set S's N and G to DH's N and G
compute KC = (S's G to the power of S's X) modulo S's N
X = a string consisting of:
  S's G
  S's N
  S's KC
  an interleaving of S's altsid and S's sid
Code = RSA encrypt X using actor's private key
Compose a Hello3 message M2:
  sid = S's sid
  include Code
set S's hello state to 3
set S's overdue time to now plus 5 seconds
send M2 to S's peer via UDP
go to STEP 902
```

FIG. 9N

```
Step 915
is M a Hello3 message? if no go to Step 916
if S's hellostate is neither 2 nor 4: go to Step 913
notify UI of good progress
T = RSA decrypt M's code using key S's otherpub
Extract from T:
  S's G
  S's N
  KC
  X
compute KD = (S's G to the power of S's Y) modulo S's N
S's key = (KC to the power of S's Y) modulo S's N
De-interleave X to produce SS0 and SS1
if SS0 is different from S's altsid go to Step 913
Compose a Hello4 message M2:
  sid = S's sid
  include RSA encrypted KD using agent's private key
set S's hello state to 4
set S's overdue time to now plus 5 seconds
send M2 to S's peer via UDP
go to STEP 902
```

FIG. 9O

```
Step 916
is M a Hello4 message? if no go to Step 917
if S's hellostate is neither 3 nor 5: go to Step 913
notify UI of good progress
KD = RSA decrypt of M's KD using key S's otherpub
S's key = (KD to the power of S's X) modulo S's N
Compose a Hello5 message to M2
  sid = S's sid
set S's hello state to 5
set S's overdue time to now plus 5 seconds
send M2 to S's peer via UDP
go to STEP 902
```

FIG. 9P

```
Step 917
is M a Hello5 message? if no go to Step 919
if S's hellostate is not 4: go to Step 918
notify UI of good progress
Compose a Hello6 message to M2
  sid = S's sid
set S's hello state to 9
S's RCODE = new RC4 transformation based on S's key
S's TCODE = new RC4 transformation based on S's key
send to agent UDPComm message tagged CONNECTED
set S's overdue time to now plus 5 seconds
send M2 to S's peer via UDP
go to STEP 902
```

FIG. 9Q

```
Step 918
  (A Hello5 message when hellostate is not 4
if S's hellostate is not 9: go to Step 913
notify UI of good progress
Compose a Hello6 message to M2
  sid = S's sid
set S's hello state to 9
set S's overdue time to now plus 15 seconds
send M2 to S's peer via UDP
go to STEP 902
```

FIG. 9R

```
Step 919
is M a Hello6 message? if no go to Step 921
if S's hellostate is not 5: go to Step 920
notify UI of good progress
Compose a Hello6 message to M2
    sid = S's sid
set S's hello state to 9
S's RCODE = new RC4 transformation based on S's key
S's TCODE = new RC4 transformation based on S's key
send to agent UDPComm message tagged CONNECTED
set S's overdue time to now plus 5 seconds
send M2 to S's peer via UDP
go to STEP 902
```

FIG. 9S

```
Step 920
(A Hello6 message when hellostate is not 5
if S's hellostate is not 9: go to Step 913
notify UI of good progress
set S's overdue time to now plus 15 seconds
go to STEP 902
```

FIG. 9T

```
Step 921
(is M a DATA message? if no go to Step 922
if M's sequence number > S's last-data-got plus 1
    (a message got lost somewhere
    inform UI of missing packet
    send a NACK message with M's sequence number back to
sender
    go to STEP 902
if M's sequence number <= S's last-data-got
    (a message got duplicated somehow
    inform UI of duplicated packet
    send an ACK message with M's sequence number back to
sender
    go to STEP 902
(it is a new message
inform UI of good communications
send an ACK message with M's sequence number back to
sender
if M is encrypted:
    apply S's RC4 decryption (RCODE) to the remainder of it
send a UDPComm message tagged RECEIVED, containing M,
to the agent
go to STEP 902
```

FIG. 9U

```
Step 922
  is M an ACK message? if no go to Step 923
  if M's sequence number not equal to S's last-data-sent:
    inform UI of bad communications
    go to STEP 902
  inform UI of good communications
  S's ackdue = 0
  S's ackduecount = 0
  remove the acknowledged message from S's queue
  go to STEP 902
```

FIG. 9V

```
Step 923
  is M a NACK message? if no go to Step 924
  inform UI of bad communications
  go to STEP 902
```

FIG. 9W

```
Step 924
  is M a PING message? if no go to STEP 902 (there is no
alternative left
  if S's hello state is 9:
    S's overdue = now plus 5 seconds
    S's overduecount = 0
    inform UI of good communications
  go to STEP 902
```

FIG. 9X

METHODS AND APPARATUS FOR MANAGING RISK IN DIGITAL COMMUNICATIONS OF THE INDUSTRIAL INTERNET OF THINGS

FIELD OF THE DISCLOSURE

The present disclosure relates to apparatus and methods capable of logical communication across multiple communication networks, wherein the apparatus and methods are generally agnostic to the modality of the underlying communications network.

BACKGROUND OF THE DISCLOSURE

Recent advances in mobile communications, the Internet, WiFi, Bluetooth, Near Field communications, and other modalities of digital communications have developed an increasingly connected world of electronic communication devices. The use of such devices has become so commonplace that the devices are sometimes personified such that society does not distinguish between a person's smart device (iPhone, Android etc.) and the person who operates the device. As such, it is commonplace to have expressions such as "texting" a person or "calling" a person, when in fact what is transpiring is a digital communication between two devices with enough processing power and executable software to be considered "smart". The digital communication will occur over a modality that adheres to some standard or set of rules, examples may include, but not be limited to: a cellular telephone network, an Internet Protocol network, Bluetooth, Near Field, ANT, IEEE 802.X standard or other type communication network.

More recently, the Internet of Things (IoT), smart cars, smart buildings, transportation systems, mapping systems and merchant delivery systems have added even more automated communication devices that seek to transmit and receive electronic communications over digital communications.

However this proliferation of digital communications has also caused large-scale aggregation of data. The nature of existing communications networks is conducive to identifying one or more of: who has sent a communication, who will receive a communication, when and where the communication is sent and received; and even the content of a communication. Often such aggregation is not to the benefit of the sender or receiver.

Accordingly, it is advantageous to have devices and methods of operation that communicate across established communications networks, but are not conducive to aggregation and/or interception.

SUMMARY OF THE DISCLOSURE

The present invention provides for apparatus and methods of operation of the apparatus that are capable of digital and/or analog logical communication across existing communications systems in a manner that is essentially agnostic to a type of electronic communications network infrastructure communicated across. The communications that are transmitted and received according to the present invention remain very difficult to aggregate or to determine the contents of. In many embodiments, the electronic communications according to the present invention remain essentially imperceptible to network operators.

PeN allows an automated device to be operated by a person or another automation (sometimes referred to herein as entities (E)) to exchange data and private communications directly (D) and securely (S) wherever they may be (B), without having to trust any third party. Entities exercise control over what they share and with which other entities they share. Communications are transacted directly, in the sense that intermediaries (such as servers) are not included or involved in the communication. Communications are not aggregated or otherwise kept anywhere along a communications pathway, not even temporarily or in encrypted form. A Sender Agent is provided a high degree of confidence that only intended a recipient Receiver Agent can receive a given message. A Receiver Agent has an equally high degree of confidence that a message really came from a purported Sender and has not been modified since. Communication between a Sender Agent and a Receiver Agent may be maintained for so long as they are connected by some network or combination of networks.

BRIEF DESCRIPTION OF THE DRAWINGS

The accompanying drawings that are incorporated in and constitute a part of this specification, illustrate several embodiments of the disclosure and, together with the description, serve to explain the principles of the disclosure:

FIG. 3 illustrates an exemplary log of electronic communication between the first Agent 101 and the second Agent 102.

DETAILED DESCRIPTION

Figure 1:
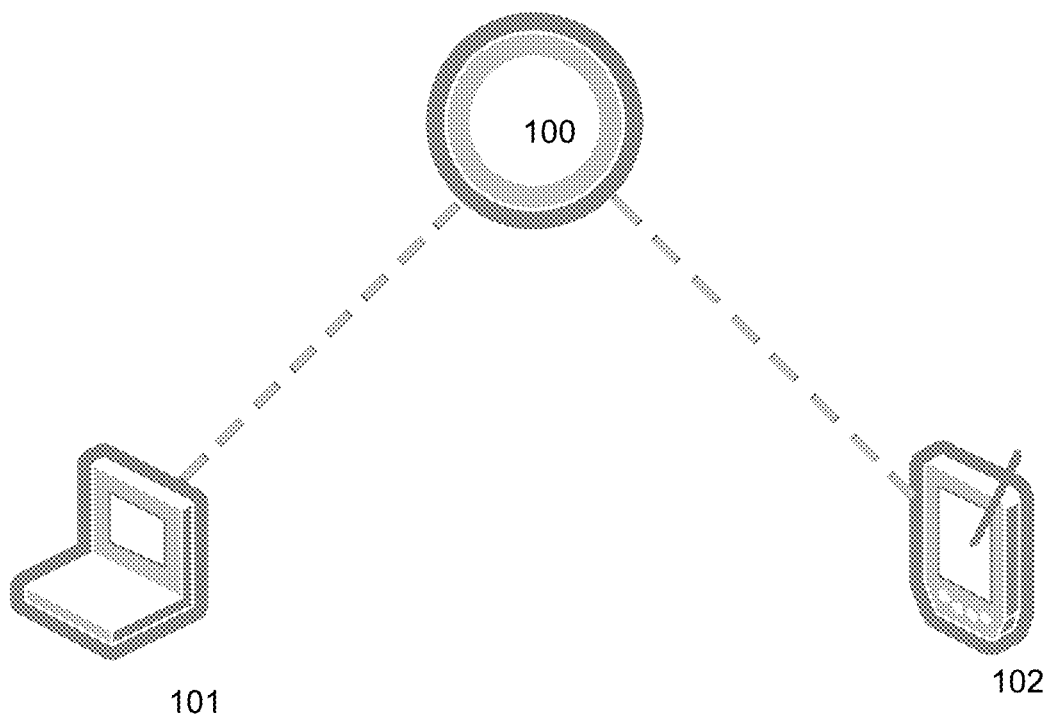
FIGS. 1-2 illustrate a block diagram of components that may be used in some embodiments of the present invention.

The present invention includes methods and apparatus for electronic communication between two Agents across one or more electronic network infrastructures formed into a virtual personal electronic network (sometimes referred to herein as "PeN"). Agents exist within a virtual machine and eliminate opportunities for "man in the middle attacks" since no man in the middle exists. The virtual machine is manifested for only a very short duration and may cease to exist following a communication as an Agent. When the Agent is no longer in existence, it cannot be hacked, or even identified, since it is no longer there. In some embodiments, the communication is applicable to the Industrial Internet of Things ("IIoT"), which includes digitization of physical systems that enables physical assets to become elements of information systems. Industry 4.0, for example, describes the full digitization of production processes and estimates of the economic value added range from $800 billion to over $1 trillion.

Within the next few years, there will be over 20 billion devices connected to the internet, vastly increasing the "surface area" available for breaches. Every node and/or device becomes a potential entry point and interconnection that may be manipulated to spread damage from a security breach, multiplying a security risk exponentially. In contrast, a PeN according to the present invention, provides an end-to-end solution for risk reduction on the IIoT; with PeN, legacy devices and networks can be securely integrated into the IIoT. A PeN is created inside a Virtual Machine (VM) and performs a task from within the VM and ceases to exist when the process that creates the VM ceases.

Typically, a PeN is created as a non-secure communication vehicle and is associated with a PeN Address that includes an IP address and a Port Number. The Virtual Machine may then create secure communication channel between two or more PeN Addresses. A communication is conducted between the PeN Addresses. The Virtual Machine hosting the Pen may then be destroyed and the opportunity for infiltration of the PeN is also destroyed since the PeN no longer exists.

The PeN software creates overlay networks of private, highly secure, end-to-end encrypted channels on existing network infrastructure for confidential communications between nodes. PeN enables secure monitoring and control of remote systems with true cybernetic feedback loops for command and control.

PeN software integrates non-proprietary Internet protocols to protect and transmit communications in as operating environments as reasonably possible, whether as software or embedded as firmware. A unique feature of PeN is its extraordinarily compact size and ability to operate in environments with severe constraints on computational power and/or memory.

In a PeN network, all nodes are defined as Agents. All PeN Agents have specific properties, but the devices for which they provide communications may be heterogeneous and diverse.

In addition to the high level of data security inherent in the PeN design, PeN provides fully encrypted, low-latency communications at speeds like those found on direct telecommunication connections.

Structure of PeN

Agents

An Agent is an electronic communication device capable of identifying itself and other Agents with which it communicates, as such, an Agent is a fundamental component that drives a PeN. Agents bridge the gap between external entities (persons or automations) and the PeN system, allowing those entities to communicate via private, secure PeN channels. The external entities involved may include one ore more of: human users, automated devices, software actors (AIs, chat bots, user assistants, data access portals, etc.) and hardware devices.

In a general overview, a device including controller creates PeN Agents and provides them with secure certificates of identity to share with other Agents, enabling strong encryption and proof of identity. In some embodiments, blockchain technology is incorporated into and/or combined with the secure certificates. The blockchain may help authenticate the generation of the certificates and/or track transfer of the certificates. In some embodiments, a device including the controller may include one or more of: a smart device; a computer or any other device with a processor with access to executable logical steps. The logical steps may be embodied in a tangible storage medium, such as an electronic or optical digital storage device.

PeN Agents may be located anywhere on a plurality of networks that enable logical communication between the Agents. If those networks are connected, Agents can create private channels between themselves and form a secure PeN virtual network.

Communications among PeN Agents travel across this plurality of networks and require no additional support for communications. The only network entities that PeN Agents interact with are other PeN Agents. In some embodiments, a network may include multiple modalities, such as a cellular network and an Internet Protocol network.

An installation of the PeN software on a device supports the independent existence of any number of PeN Agents on that device (subject to the design limitations of the device: memory, computational speed, bandwidth, etc.).

The "owner" of a PeN installation defines the individual functionalities of its Agents, including hierarchical levels of command authority and domains of operation. Agents are configured by their "owners" to allow or deny access to information and to decide which activities they will participate in.

Registries

Registries accept information from PeN Agents, that inform the Registry of their identities, locations, functionalities, and willingness to participate in different forms of interaction. A Registry works entirely within the secured boundaries of the PeN system and maintains connectivity information so Agents may find one another. Registries make this information available to other authorized Agents and automatically push updates to connected Agents that have requested them. A Registry may actively query Agents by occasionally pinging them if they have not been heard from in a while.

A PeN Group is the set of Agents that are connected to the same Registry. A PeN Agent may participate in any number of PeN Groups concurrently. These groups may or may not be aware of the existence of each other. Any PeN Agent may be configured to form a Registry.

An Agent may be connected to any number of Registries, and therefore be a member of any number of PeN Groups, simultaneously. An Agent may initiate and participate in communications with any subset of other Agents that it can find, regardless of whether or not those Agents belong to the same PeN Group.

Communications by a Registry are composed and dealt with automatically. No human supervision is required, but a Registry will often be configured to include a GUI to allow management of its behavior by a human controller. These management functions can be accessed by Agents that present proper certification.

A Registry may be configured to make a PeN Group completely open to any Agent, completely secret, restricted to those in possession of appropriate credentials, or any number of other configurations useful in a particular application.

Typically, each PeN Group is maintained by a single Registry. Though not included in the current iteration of the PeN platform, PeN Groups can be structured to be supported by multiple Registries that share all group participation information, thus adding additional redundancy and protection against malicious attacks on the network.

PeN Groups may also be configured to communicate without a Registry. This configuration will be less resilient but may provide additional security.

Figure 2:
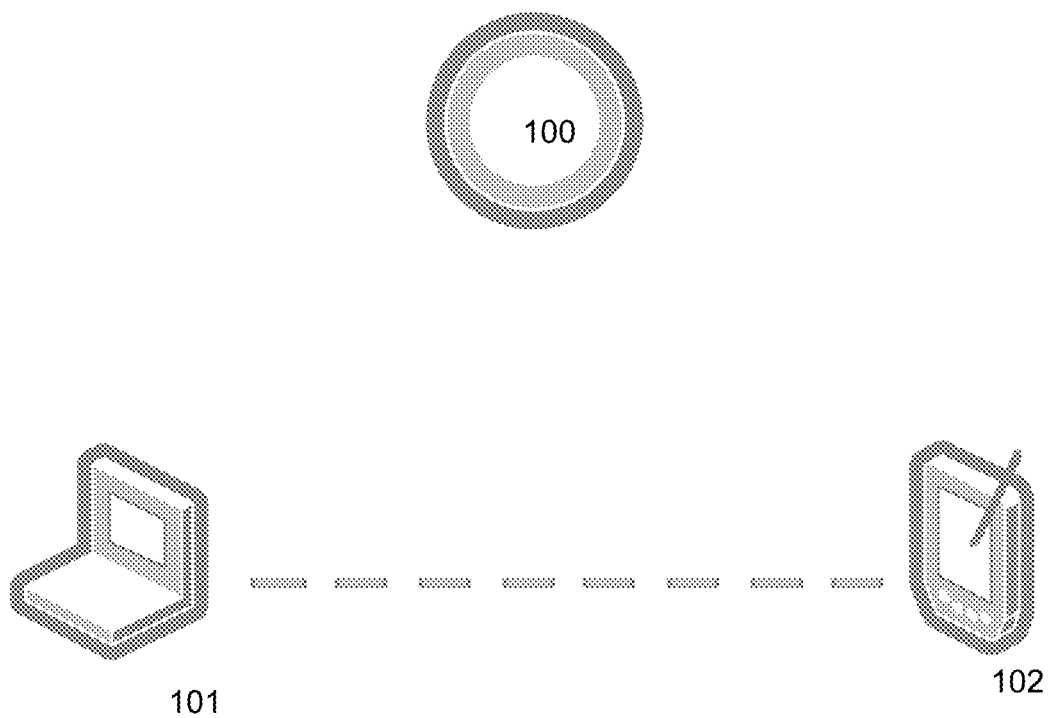

FIG. 1 and FIG. 2 illustrate block diagram components included in a PeN Network. Generally, referring to FIG. 1, a registry 100 is contactable by a first Agent 101 via electronic communication. The Registry 100 receives via electronic communication a request for the first Agent 101 to directly communicate with a second Agent 102. Based upon the request from the first Agent 101, Registry 100 electronically communicates to the second Agent 102 a logic instruction including how second Agent 102 may initiate direct communication with the first Agent 101 if the second Agent 102 chooses to do so. In preferred embodiments, registry 100 communicates to the second Agent via designate of an IP address and port that the Registry 100 has on record for the second Agent. Similarly, the logic instruction communicated to the second Agent 102 includes an IP address and a port for the first Agent which the second Agent 102 may utilize to initiate electronic communication with the first Agent 101. Other embodiments include the Registry 100 contacting the second Agent 102 via an electronic modality other than an IP address and port, such as via telephonic contact or cellular network contact.

Referring now to FIG. 2, the second Agent may initiate electronic communication with the first Agent 101 using the information provided to the second Agent 102 from the Registry 100. In some embodiments, the Registry 100 may also indicate to both the first Agent 101 and the second Agent 102 how they may contact with each other. In FIG. 2 the first Agent 101 and a second Agent 102 communicate directly without the intercession of the Registry 100 or any indication to the Registry as to whether the first Agent 101 and the second Agent 102 enter into direct communication, or what transactions transpire during any direct communication, or what information is transmitted between the first Agent 101 and the second Agent 102. Similarly, in some embodiments, the Registry 100 will not generate or store a log of any communications received from or transmitted to any Agent. Other embodiments include the Registry 100 generating a log of some or all communications between the Registry 100 and the Agents 101-102.

In a related aspect, in some embodiments, the first Agent 101 and/or the second Agent 102 may generate a log detailing electronic communications between the first Agent 101 and the second Agent 102.

Embodiments of the present invention include electronic communication according to the present invention utilize infrastructure, such as conduits, switches and routers, but with no access to servers located on the network and no storage of decipherable data included in the electronic communication stored on servers present on the network.

Figure 3:
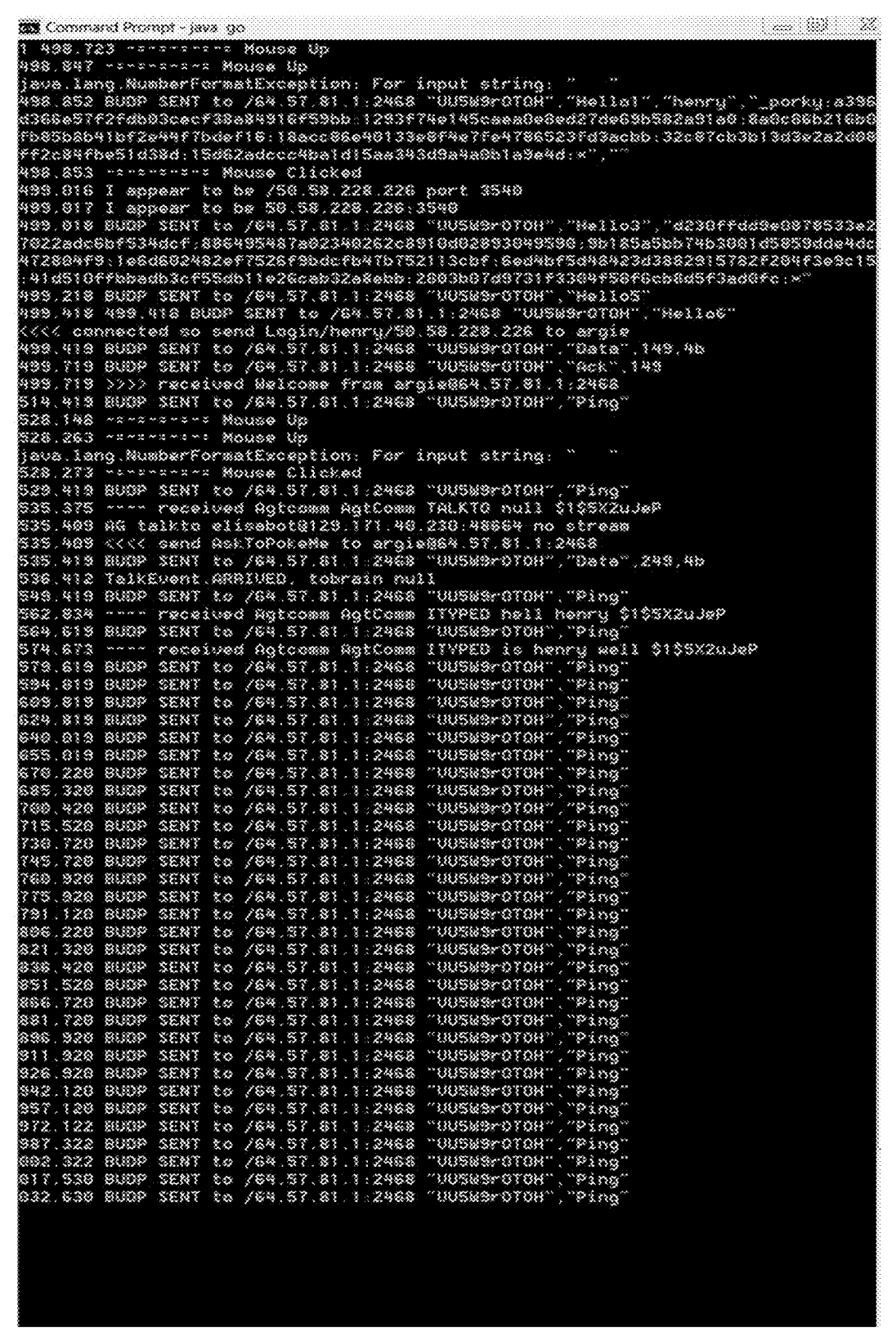

FIG. 3 illustrates an exemplary log of electronic communication between the first Agent 101 and the second Agent 102. The log may include almost any recordable fact relating to a communication session, such as, for example, one or more of: an index of transactions 301; an IP address and port involved 302; and a logical instruction 303.

Figure 4:
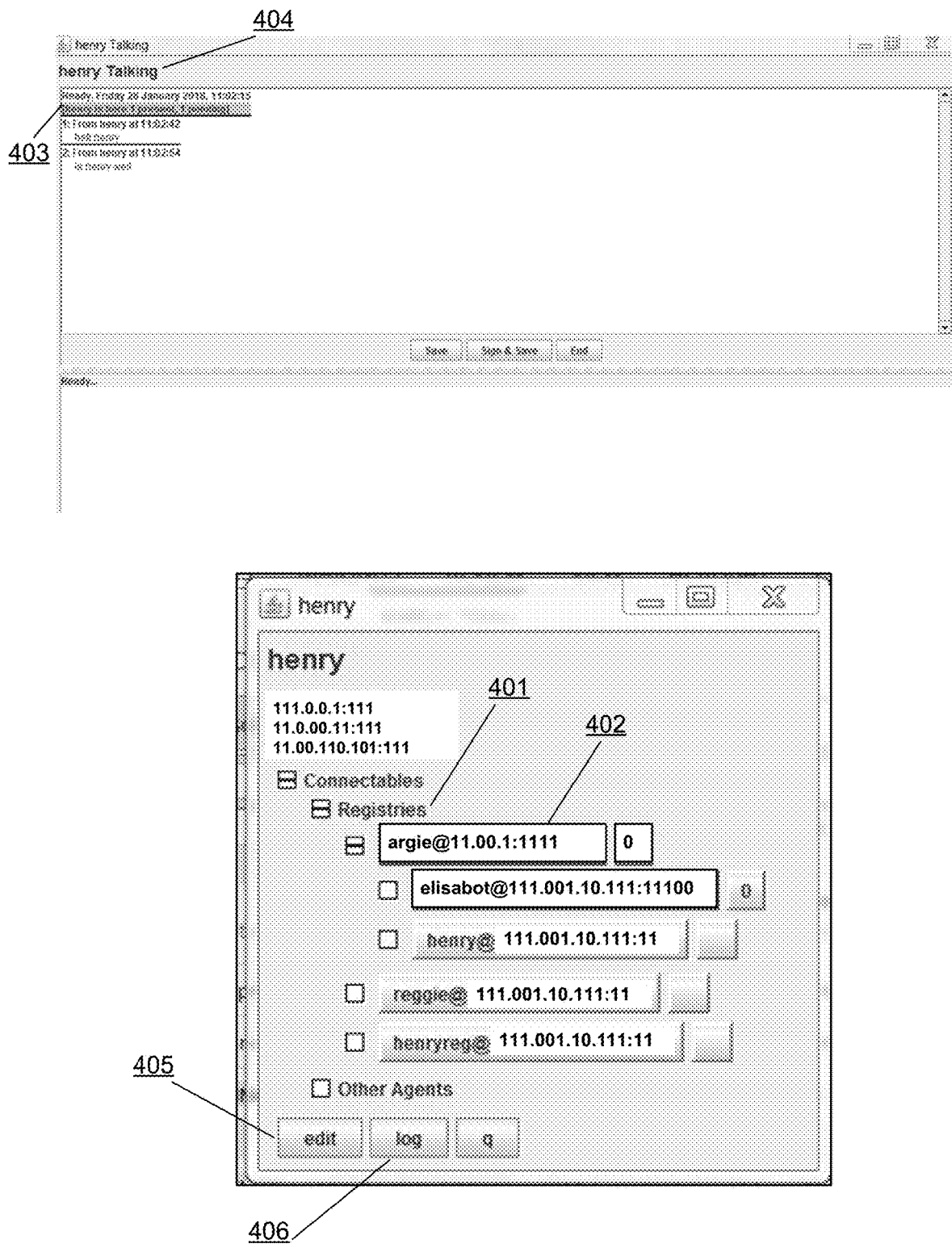
FIG. 4 illustrates exemplary user interface that may be used in some implementations of the present invention.

FIG. 4 illustrates exemplary user interfaces that may be used in some embodiments of the present invention. The interface may include one or more Registries, and each Registry 401 will include one or more Agent identifying information 402. The Agent identifying information 402 may include an annotation and an IP address and port. The user interface may also include an annotation descriptive of an Agent 403 and an activity the Agent is engaged in 404.

User interactive devices, such as a hardware or GUI generated push button 405-406 may provide access to additional functionality useful to a communication session. An additional functionality of the push button may include, by way of non-limiting example, a button to access the ability to edit Agent information 405. The Agent information may include an annotation or IP address or port designation. Another button may relate to functionality of a log 406. Functionality relating to a log may include, for example, to commence logging detail, to cease logging details, or to access details already logged and/or in the process of being logged.

Security

Every PeN Agent has a digital certificate of identity and private encryption key distinct from the network access device that the Agent may be utilizing at any specific moment. These certificates are issued by a trusted authority. Options including self-certification or limitations on accepted certificates may be implemented.

A PeN Agent will not respond without access to a valid certificate and private key. PeN may be configured to require a password to be entered in order to make use of a private key, thus providing dual authentication. Time-outs may also be added for critical Agents, so that passwords must be reentered after the passage of a certain amount of time. By these mechanisms, PeN alleviates the End Node Problem.

An activated PeN Agent operates independently and only a device failure or deliberate action terminates its functionality. Because each PeN Agent is self-contained, all components are authorized to conduct their legitimate operations without need for additional external credentialing. PeN Agents control what information about themselves they share with other Agents and what interactions they will participate in with other Agents.

All PeN Agents, including those running remote Registries, may use all of the services of any Registry if authorized to do so. This allows remote Registries to become relatively obscure: There is no PeN equivalent to DNS where Registries' IP addresses are publicly exposed, there are no well-known port numbers, and Registries may migrate their locations at any time. A Registry may even secrete itself, being only discoverable through another Registry. This provides additional security for sensitive communications.

Audit Trails

PeN may be configured to keep transcripts of all interactions and complete time-stamped audit trails of all actions by any Agent or human operator. These audit trails may be saved automatically as encrypted files. A stand-alone app may be provided so that encrypted files may be viewed outside the PeN system (provided that the user has the required private key and password).

Additional Security Features

PeN does not use external servers, thus making a denial of service (DOS) attack against a PeN system inherently difficult. The certification of PeN Agents protects against man-in-the-middle attacks.

Information about PeN Agents on a PeN system is encrypted, so only the most basic information about other known Agents (current IP address and port) can be detected by packet sniffers.

Structure of Communications in PeN

Communications across a PeN Group take the form of Conversations. An Agent may seek to initiate a Conversation between itself and any number of other Agents of which it is aware. When an Agent accepts the request to join a Conversation, it becomes part of the Conversation. Every Agent in a Conversation maintains a list of the other PeN Agents in the same conversation. Agents in a PeN Group that are not part of a Conversation are unaware of the Conversation. An Agent may leave a Conversation at any time.

Agents regularly monitor the state of other Agents with which they are connected to ensure near real-time network functioning.

PeN communications are direct endpoint-to-endpoint communications that do not involve any intermediaries (apart from basic network infrastructure). This significantly reduces the latency inherent in typical VPN systems.

PeN is designed to ensure the reliability of communications. To enhance the speed of communications involving audio or video streaming, some features may be disabled just for those components of a conversation where packet loss is not critical, without reducing the security of the PeN system.

Actors

Actors provide "intelligence" behind Agents: they issue commands and requests, provide the logic for useful behavior, and provide the necessary responses. An actor may be a human user, a hardware automation, or a processor in communication with an executable software construct such as artificial intelligence apparatus (A.I.s) conversational robots, expert systems, and database access gateways. PeN makes no operational distinction between the various types of actors. In preferred embodiments each Agent will have only one actor, or run a Registry, or have both an Actor and a Registry.

Actors are independent entities and are not part of a PeN Agent, but may make use of all or some of an associated Agent's functionality.

In some embodiments, a PeN includes APIs that provide links between Agents and actors. Programmers may use these APIs in the creation of software actors, or to replace the provided interface for human actors.

Human Actors

Agents may be equipped with interfaces that allow human beings to be the controlling actors and communicate with PeN Agents. PeN can allow a group of humans to engage in completely secure, strongly encrypted communications that may include file transfers, voice, and graphical elements.

Software Actors

Software actors form the connection between PeN Agents and external devices. They also allow external services to be created. Developers can create specific software actors to interface with these services. A well-designed software actor maintains a security break between services, external devices, and other Agents.

A software actor performs some service autonomously. Software actors may access Registries' information and participate in conversations via other Agents.

A software actor may provide interfaces to physical hardware such as environmental sensors or actuators. In this case a Conversation could be a one-sided stream of data, or it could be an interactive session of commands or enquiries alternating with acknowledgements or answers.

A software actor may take the form of an expert system, answering questions or helping users or customers to perform their tasks. A software actor may provide a connection to another non-PeN software system such as a database, a spreadsheet, or a file repository.

Figure 5:
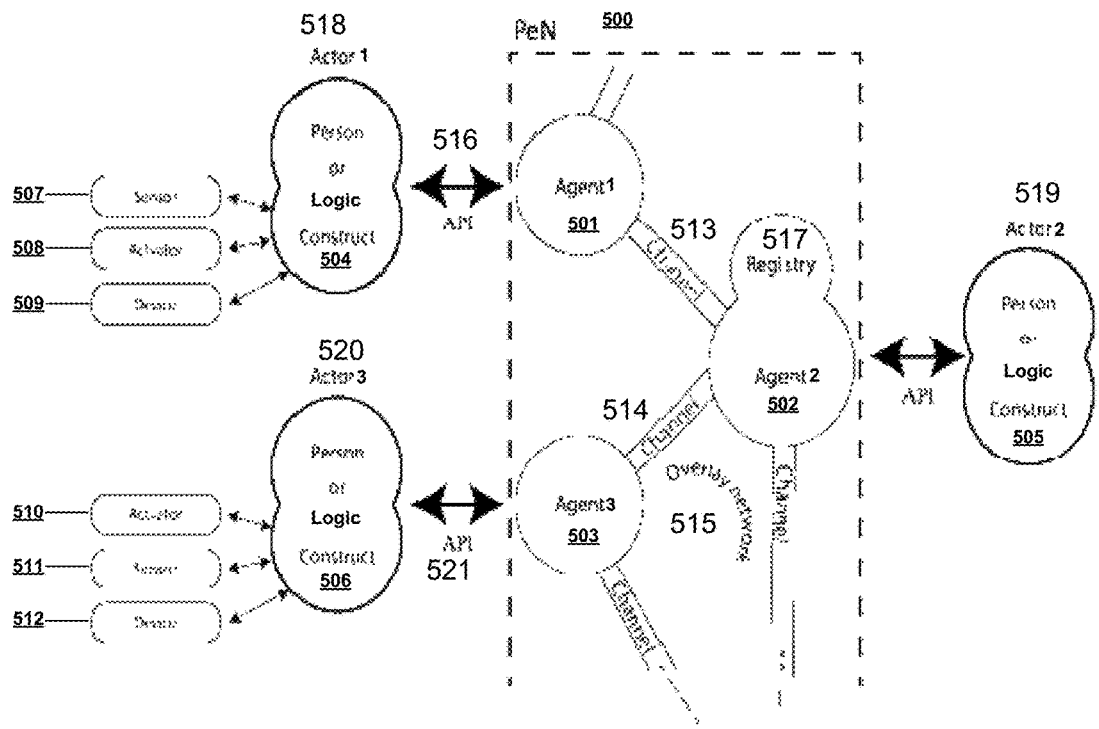
FIG. 5 illustrates an Infographic diagram illustrating Basic Structure of some embodiments of a PeN Network.

Referring now to FIG. 5, an Infographic diagram illustrates Basic Structure elements included in a PeN Network. Actor 1 518 controls a logic construct 540 to interface with an Agent 1 501 and an application programming interface (API) 516. Based upon logic and associated information that traverses the API 516, Agent 1 electronically communicates with Agent 2 502 via a communications channel 513, wherein Agent 2 502 includes a registry 517.

The electronic communication from Agent 1 501 to the registry located with Agent 2 502 requests communication with an Agent 3 503. An Actor 2 519, which may be a logic construct or a person, causes Agent 2 to electronically communicate with Agent 3 503 via a communications channel 514 and convey the request to communicate originating from Agent 1 501. Agent 3 503 may be controlled by Actor 3 520 via an API 521 to accept or deny the request to communicate with Agent 1 501. Actors 518-520 may be persons or an automation capable of logical processing and communication. Accordingly, an Actor 518-520 may in turn be in logical communication with a logical input device 507-512, such as, for example, one or more of: a sensor 507 511, an activator 508 510 or smart device 509 512. Common apparatus that may include one or more a logical input devices 507-512 may include, by way of non-limiting example; a smart household appliance, home automation, an motor vehicle, a property security device or other apparatus conducive to providing a setting for an logical input device 507-512.

A communications channel 513-514 may include a medium capable of supporting electronic communication and therefore include, by way of example, a IP protocol network, a cellular network, WiFI, and Bluetooth.

Embodiments of the PeN Environment

According to the present invention, a PeN may be specifically designed to be usable in as many situations as is reasonably possible. Accordingly, various embodiments of a PeN may include a hardware device, firmware and/or a controller in logical communication with or containing executable software steps. It will run on any platform that supports the standard distribution of Java (Windows, Macintosh, Linux, Raspbian, BSD, and many others), and it has an extraordinarily small footprint: the entire system is significantly less than 1 MB uncompressed, and numerous instances can run simultaneously on a device as limited as a Raspberry Pi. PeN may be implemented in a wide variety of programming languages.

PeN is an integrated, non-operating-system-dependent means of creating secure overlay networks that allow secure and stable communications, including true cybernetic command and control feedback loops. The PeN methodology is an optimal solution for creating and managing heterogeneous networks of sensors, activators, devices and human and/or software constructs through the use of Agents that communicate only with other Agents across private, unmediated channels. PeN is an optimal solution for risk reduction in high-value, high-risk cybernetic implementations on the IIoT. PeN deployments are ideal for environments with limited memory and/or computational power.

Figure 6:
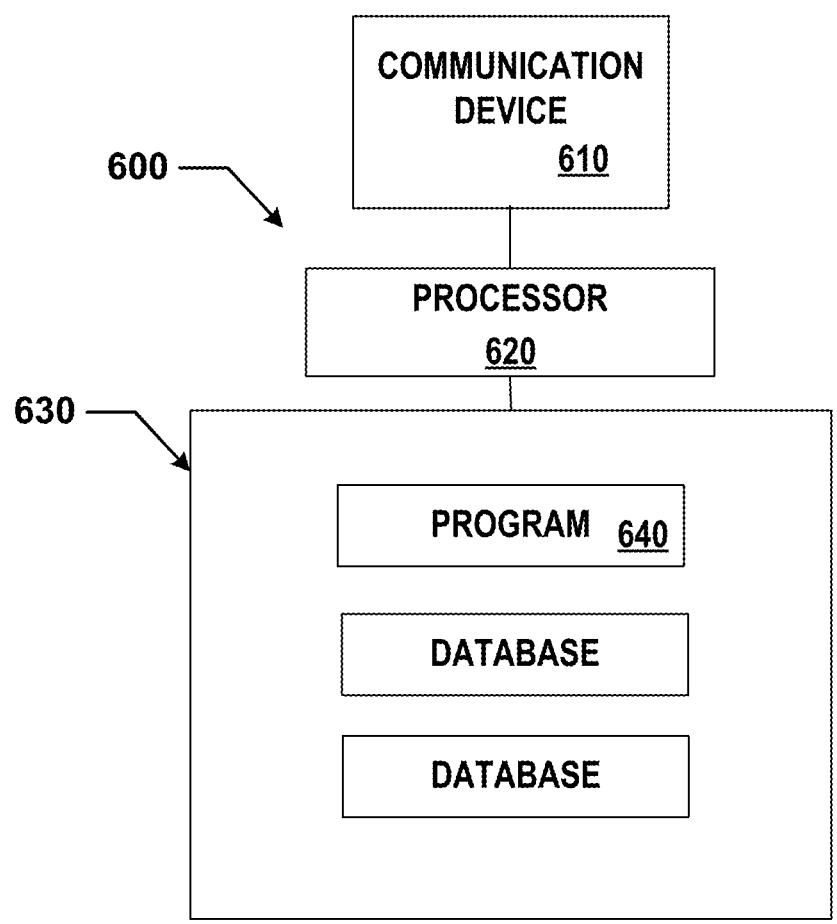
FIG. 6 illustrates a controller apparatus that may be used to implement aspects of the present disclosure.

Referring now to FIG. 6 an automated controller is illustrated that may be used to implement various aspects of the present invention, in various embodiments, and for various aspects of the present invention, controller 600 may be included in one or more of: a wireless tablet or handheld device, a server, a rack mounted processor unit. The controller may be included in one or more of the apparatus described above, such as a Server, a smart device, a smart appliance, home automation, or any automation including a controller and executable logic instructions that may also act as a Network Access Device. The controller 600 comprises a processor unit 620, such as one or more semiconductor based processors, coupled to a communication device 610 configured to communicate via a communication network (not shown in FIG. 6). Some examples of controllers that may be integrated into an Agent include the Broadcom BCM2837B0, BCM 2835, BCM 2836, and BCM 2837. Other Agents may be supported by an iOS, Android, LINUX and/or Windows based machine. The communication device 610 may be used to communicate, for example, with one or more online devices, such as a personal computer, laptop, or a handheld device.

The processor 620 is also in communication with a storage device 630. The storage device 630 may comprise any appropriate information storage device, including combinations of magnetic storage devices (e.g., hard disk drives), optical storage devices, and/or semiconductor memory devices such as solid state storage devices (SSD), Random Access Memory (RAM) devices and Read Only Memory (ROM) devices.

The storage device 630 can store a software program 640 with executable logic for controlling the processor 620. The processor 620 performs instructions of the software program 640, and thereby operates in accordance with the present invention. The processor 620 may also cause the communication device 610 to transmit information, including, in some instances, control commands to operate apparatus to implement the processes described above. The storage device 630 can additionally store related data in a database 650 and database 660, as needed.

Figure 7:
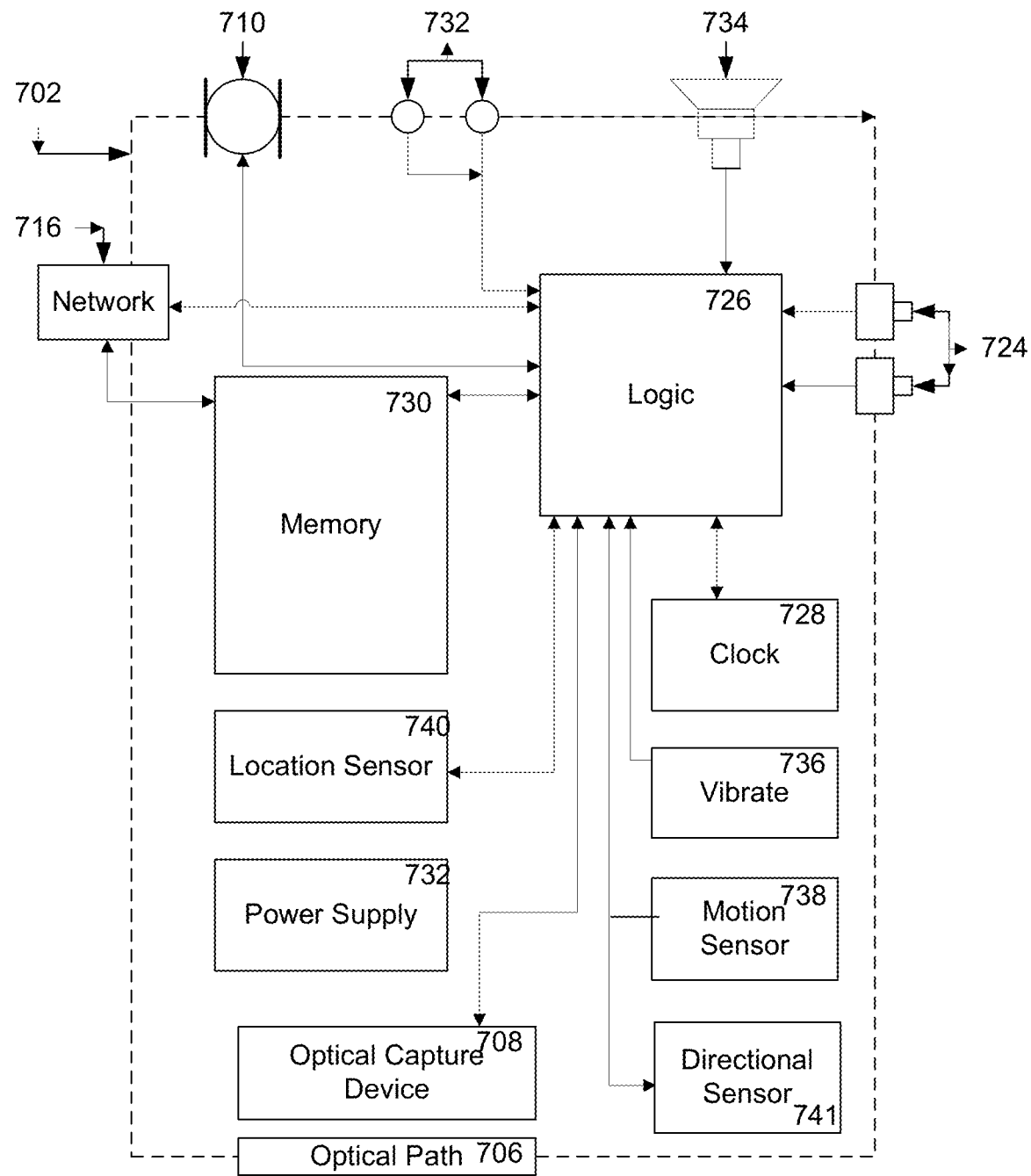
FIG. 7 illustrates an exemplary mobile smart device that may be used in some implementations of the present invention.

Referring now to FIG. 7, a block diagram of an exemplary mobile smart device 702 is shown. The mobile smart device 702 comprises an optical capture device 708 to capture an image and convert it to machine-compatible data, and an optical path 706, typically a lens, an aperture or an image conduit to convey the image from the rendered document to the optical capture device 708. The optical capture device 708 may incorporate a Charge-Coupled Device (CCD), a Complementary Metal Oxide Semiconductor (CMOS) imaging device, or an optical Sensor 724 of another type.

A microphone 710 and associated circuitry may convert the sound of the environment, including spoken words, into machine-compatible signals. Input facilities may exist in the form of buttons, scroll wheels, or other tactile Sensors such as touch-pads. In some embodiments, input facilities may include a touchscreen display.

Visual feedback to the user is possible through a visual display, touchscreen display, or indicator lights. Audible feedback 734 may come from a loudspeaker or other audio transducer 732. Tactile feedback may come from a vibrate module 736.

A motion Sensor 738 and associated circuitry convert the motion of the mobile smart device 702 into machine-compatible signals. The motion Sensor 738 may comprise an accelerometer that may be used to sense measurable physical acceleration, orientation, vibration, and other movements. In some embodiments, motion Sensor 738 may include a gyroscope or other device to sense different motions.

A location Sensor 740 and associated circuitry may be used to determine the location of the device. The location Sensor 740 may detect Global Position System (GPS) radio signals from satellites or may also use assisted GPS where the mobile smart device may use a cellular network to decrease the time necessary to determine location. In some embodiments, the location Sensor 740 may use radio waves to determine the distance from known radio sources such as cellular towers to determine the location of the mobile smart device 702. In some embodiments these radio signals may be used in addition to GPS.

The mobile smart device 702 comprises logic 726 to interact with the various other components, possibly processing the received signals into different formats and/or interpretations. Logic 726 may be operable to read and write data and program instructions stored in associated storage or memory 730 such as RAM, ROM, flash, or other suitable memory. It may read a time signal from the clock unit 728. In some embodiments, the mobile smart device 702 may have an on-board power supply 750. In other embodiments, the mobile smart device 702 may be powered from a tethered connection to another device, such as a Universal Serial Bus (USB) connection.

The mobile smart device 702 also includes a network interface 716 to communicate data to a network and/or an associated computing device. Network interface 716 may provide two-way data communication. For example, network interface 716 may operate according to the Internet Protocol. As another example, network interface 716 may be a local area network (LAN) card allowing a data communication connection to a compatible LAN. As another example, network interface 716 may be a cellular antenna and associated circuitry which may allow the mobile smart device to communicate over standard wireless data communication networks. In some implementations, network interface 716 may include a Universal Serial Bus (USB) to supply power or transmit data. In some embodiments other wireless links may also be implemented.

As an example of another use of mobile smart device 702, a reader may capture some text from an article as an audio file by using microphone 710 as an acoustic capture port. Logic 726 causes audio file to be stored in memory 730. Logic 726 may also perform voice recognition or other post-scan processing on the audio file to convert it to text. As above, the reader may then upload the audio file (or text produced by post-scan processing performed by logic 726) to an associated computer via network interface 716.

A directional sensor 741 may also be incorporated into the mobile smart device 702. The directional device may be a compass and be based upon a magnetic reading, or based upon network settings.

In the preceding and following sections, detailed descriptions of examples and methods of the invention will be given. The description of both preferred and alternative examples though through are exemplary only, and it is understood that to those skilled in the art that variations, modifications and alterations may be apparent. It is therefore to be understood that the examples do not limit the broadness of the aspects of the underlying invention as defined by the claims.

Methods and Protocols of PeN

In the following sections, methods and protocols of performing operations of a PeN device including hardware and logic instructions to generate architecture and form an end to end communication link are presented in exemplary form, it may be obvious to one skilled in the art that alterations may be made to achieve the same or similar result. Proceeding to FIGS. 8A through 8AN the various operations of the agent component of the PeN type are illustrated. Details of the various protocols are provided in some detail in the figures, while a summary of the function is discussed herein.

Figures 8A, 8B:
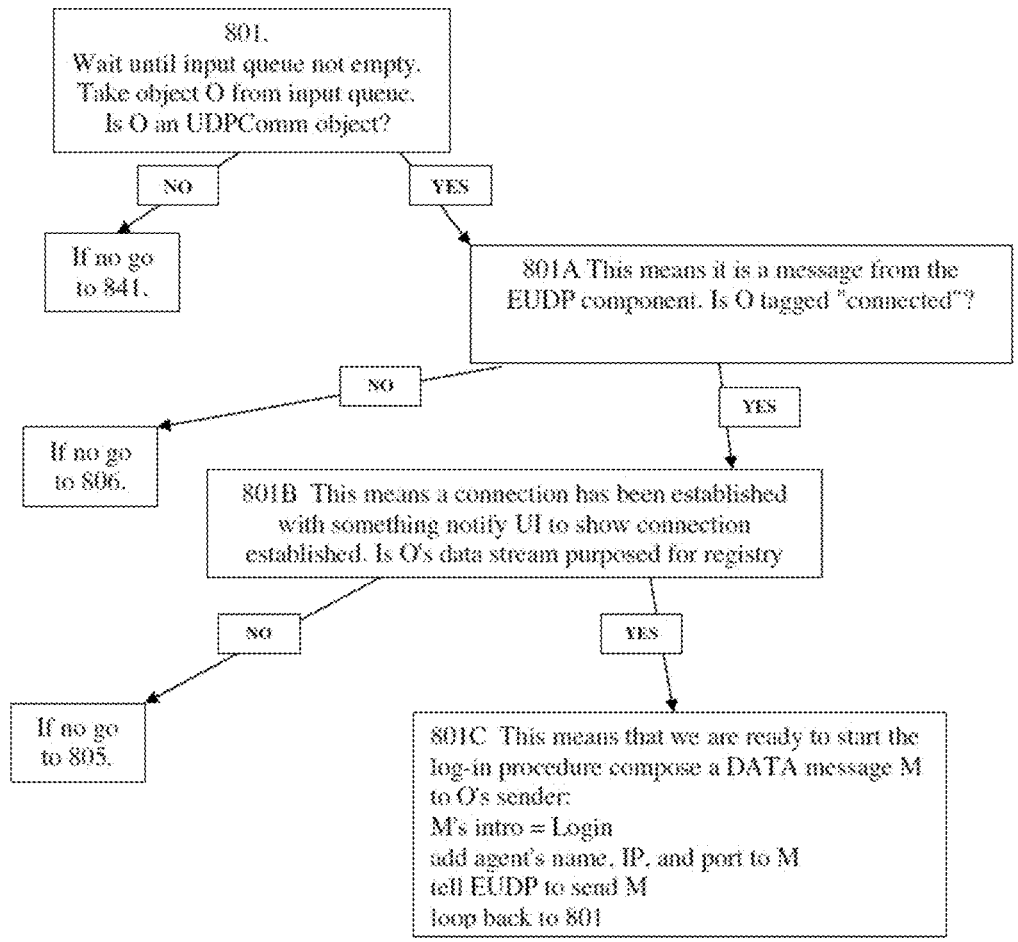
FIGS. 8A-8AN illustrate method steps that may be included in embodiments of the present invention.

Starting with FIG. 8A, a loop protocol may initiate at step 801 and determine if a queue is empty and then begin processing if it is not. The processing may test if the input is a UDPCComm object and if not jump to step 841. If it is at step 801A the message is tested to determine whether it is connected; if it is not, processing may jump to step 806, otherwise at step 801B, processing queries if the datastream is purposed for registry processing. If not then processing branches to step 805; if so, a log in procedure protocol is initiated and ultimately processing returns back to the beginning at step 801.

Proceeding to FIG. 8B, the processing at step 805 is illustrated. When processing has branched to this step, it means the processing is establishing a conversation and executes the illustrated protocol to initiate and then returns at step 801.

Figure 8C:
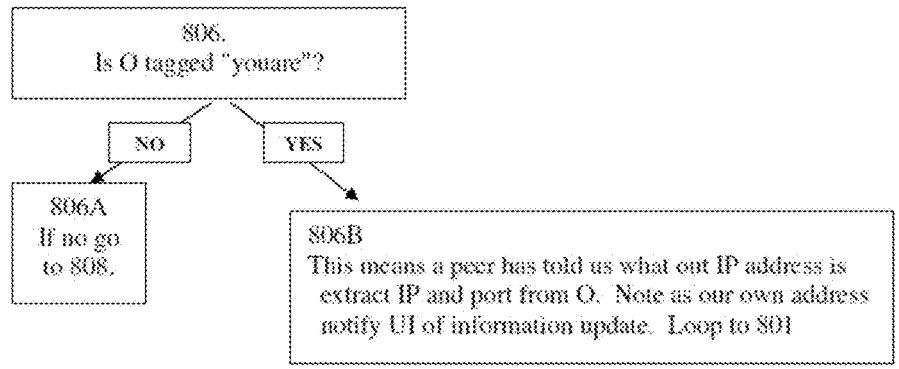

Proceeding to FIG. 8C, the processing at step 806 is illustrated. When processing has branched to this step the object is queried to see if it is tagged "You Are"; and if not processing jumps to step 808. If so, then a peer has identified an IP address and protocols are performed before returning to the beginning at step 801.

Figure 8D:
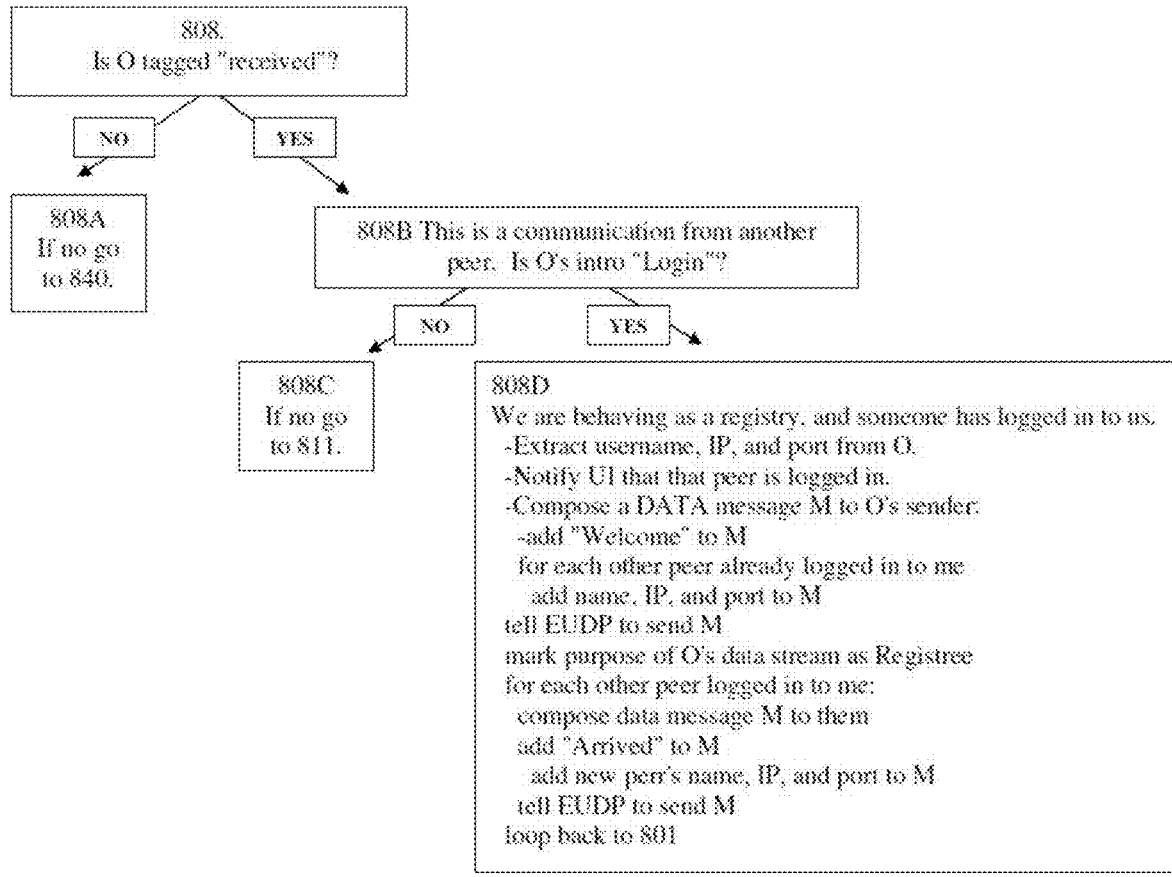

Proceeding to FIG. 8D, the processing at step 808 is illustrated. When processing has branched to this step, the object is queried to see if it is tagged "received" and if not processing jumps to step 840 at step 808A. If so, then this is a communication from another peer and the objects intro is compared to "Login" at step 808B and if it is not, then at step 808C processing branches to 811. If it is "login" then at step 808D, registry processing protocols as illustrated are performed before looping back to step 801.

Figure 8E:
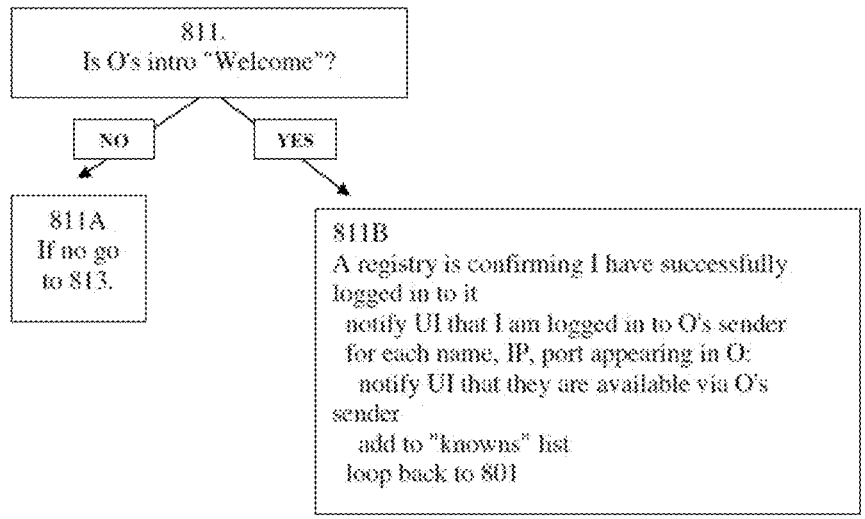

Proceeding to FIG. 8E, the processing at step 811 is illustrated. When processing has branched to this step, the object is queried to see if it is tagged "Welcome" and if not processing jumps to step 813 at step 811A. If so, then this is a communication from registry confirming successful login. Notification protocols at step 811B as illustrated are performed before looping back to step 801.

Figure 8F:
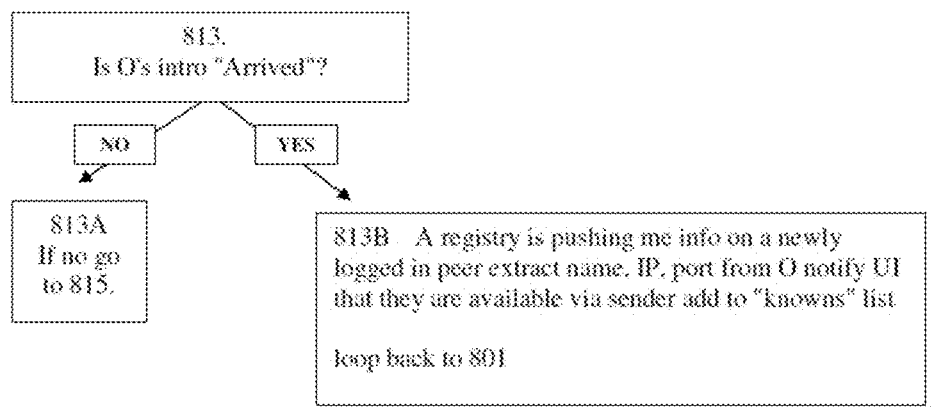

Proceeding to FIG. 8F, the processing at step 813 is illustrated. When processing has branched to this step, the object is queried to see if it is tagged "Arrived" and if not processing jumps to step 815 at step 813A. If so, then this is a communication from registry indicating information is incoming. Notification protocols at step 813B as illustrated are performed before looping back to step 801.

Figure 8G:
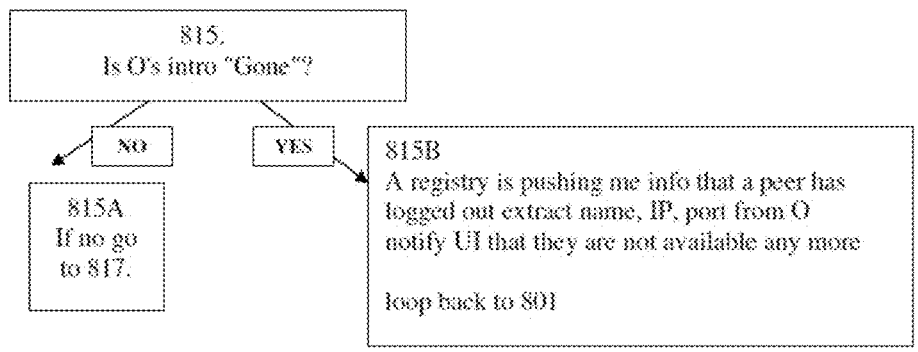

Proceeding to FIG. 8G, the processing at step 815 is illustrated. When processing has branched to this step, the object is queried to see if it is tagged "Gone" and if not processing jumps to step 817 at step 815A. If so, then this is a communication from registry indicating a peer has logged in. Notification protocols at step 815B as illustrated are performed before looping back to step 801.

Figure 8H:
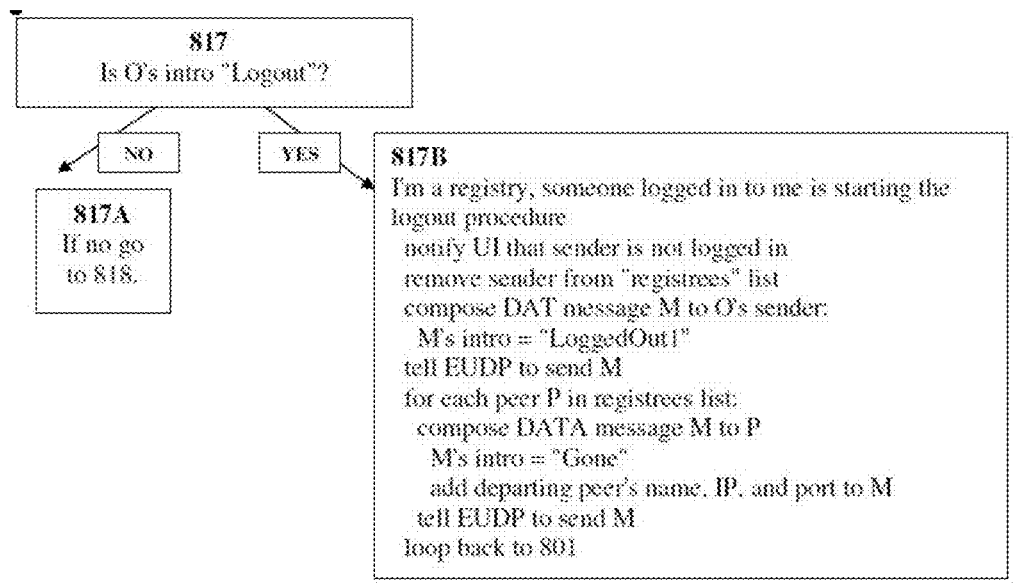

Proceeding to FIG. 8H, the processing at step 817 is illustrated. When processing has branched to this step, the object is queried to see if it is tagged "Logout" and if not processing jumps to step 818 at step 817A. If so, then this is a registry and someone logged in is starting the logout procedure. Protocols to perform the logout at step 817B as illustrated are performed before looping back to step 801.

Figure 8I:
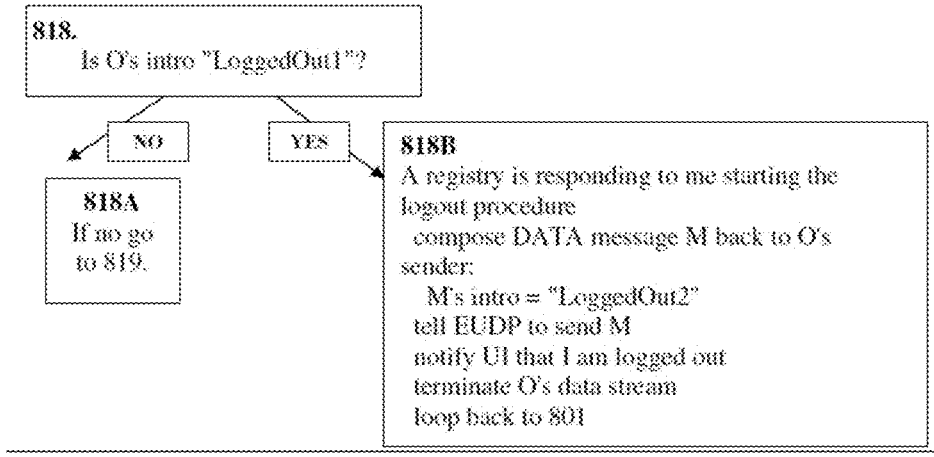

Proceeding to FIG. 8I, the processing at step 818 is illustrated. When processing has branched to this step, the object is queried to see if it is tagged "LoggedOut1" and if not processing jumps to step 819 at step 818A. If so, then a registry is responding to the start of a logout procedure. Protocols to perform the logout and make notifications at step 818B as illustrated are performed before looping back to step 801.

Proceeding to FIG. 8I, the processing at step 818 is illustrated. When processing has branched to this step, the object is queried to see if it is tagged "LoggedOut1" and if not processing jumps to step 819 at step 818A. If so, then a registry is responding to the start of a logout procedure. Protocols to perform the logout and make notifications at step 818B as illustrated are performed before looping back to step 801.

Figure 8J:
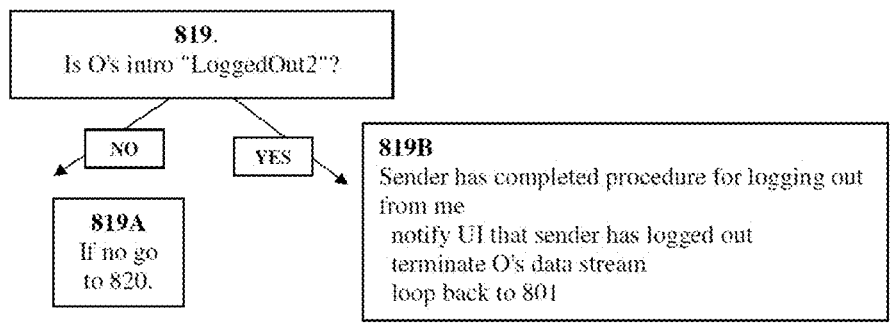

Proceeding to FIG. 8J, the processing at step 819 is illustrated. When processing has branched to this step, the object is queried to see if it is tagged "LoggedOut2" and if not processing jumps to step 820 at step 819A. If so, then sender has completed a logout procedure initiated by the processor. Protocols to perform the logout and make notifications at step 818B as illustrated are performed before looping back to step 801.

Figure 8K:
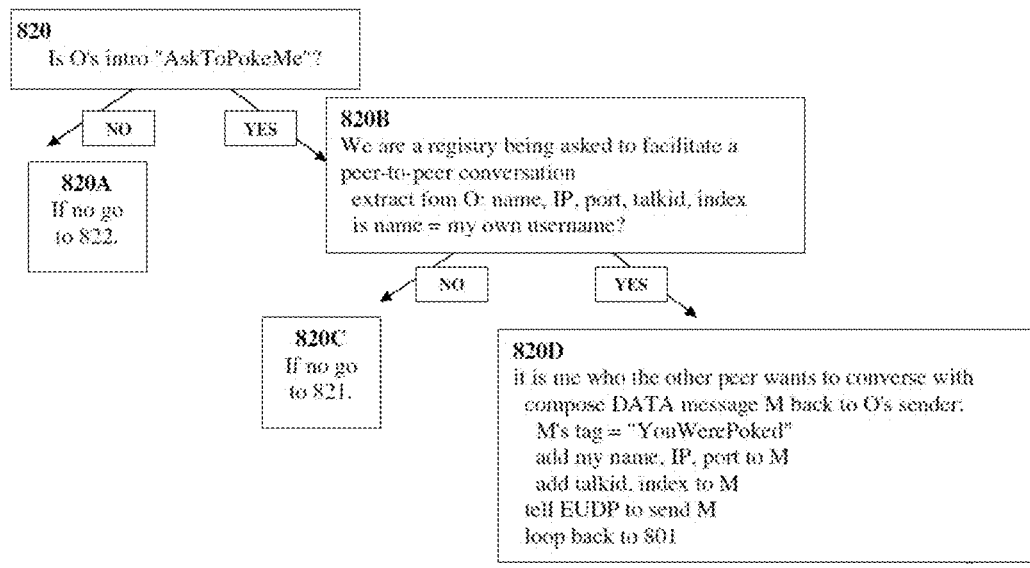

Proceeding to FIG. 8K, the processing at step 820 is illustrated. When processing has branched to this step, the object is queried to see if its intro is tagged "AskToPokeMe" and if not processing jumps to step 822 at step 820A. If so, then the communication is further processed and amongst other data a name is processed and compared to the home device at step 820B. If it is not then processing jumps to step 821 at step 820C. If it is then peer to peer communication is desired with the home device. Protocols to initiate the conversation at step 820D as illustrated are performed before looping back to step 801.

Figure 8L:
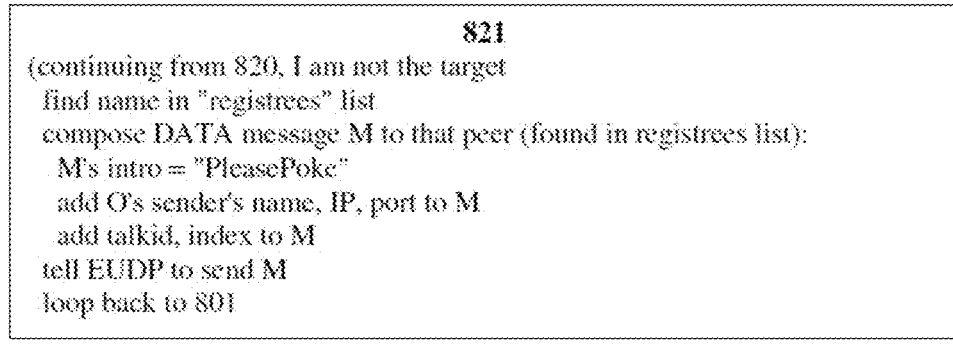

Proceeding to FIG. 8L, the processing at step 821 is illustrated. When processing has branched to this step, the home device is not the target. Protocols are performed to pass on the message on the network before looping back to step 801.

Figure 8M:
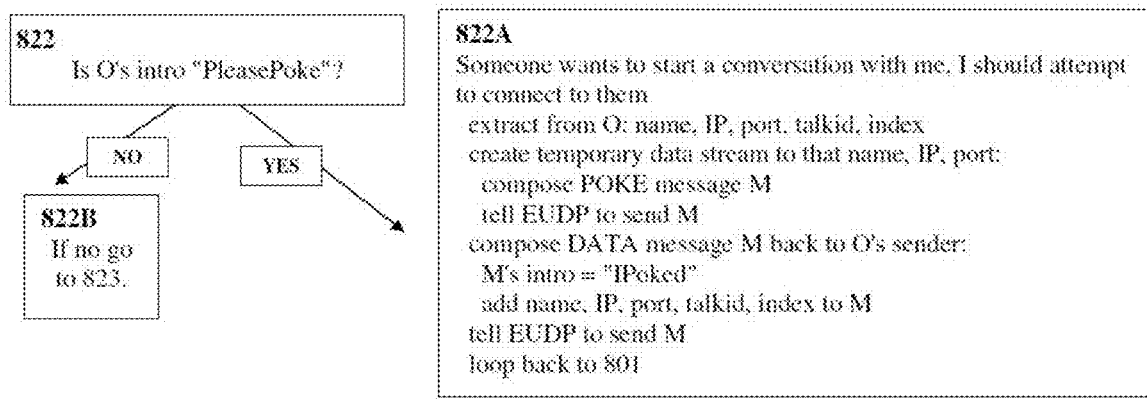

Proceeding to FIG. 8M, the processing at step 822 is illustrated. When processing has branched to this step, the object is queried to see if it is tagged "PleasePoke" and if not processing jumps to step 823 at step 822B. If so, then sender wants to start conversation and home device will attempt to connect. Protocols to make responses and notifications at step 822A as illustrated are performed before looping back to step 801.

Figure 8N:
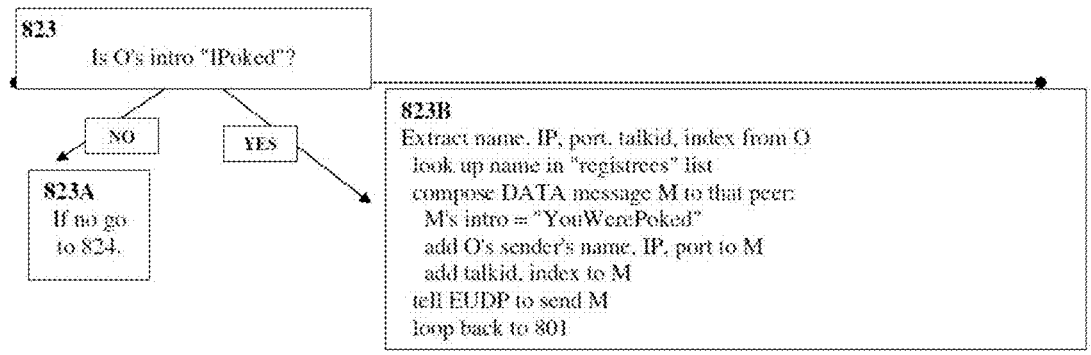

Proceeding to FIG. 8N, the processing at step 823 is illustrated. When processing has branched to this step, the object is queried to see if it is tagged "IPoked" and if not processing jumps to step 824 at step 823A. If so, then sender will respond. Protocols to perform the communication at step 823B as illustrated are performed before looping back to step 801.

Figure 8O:
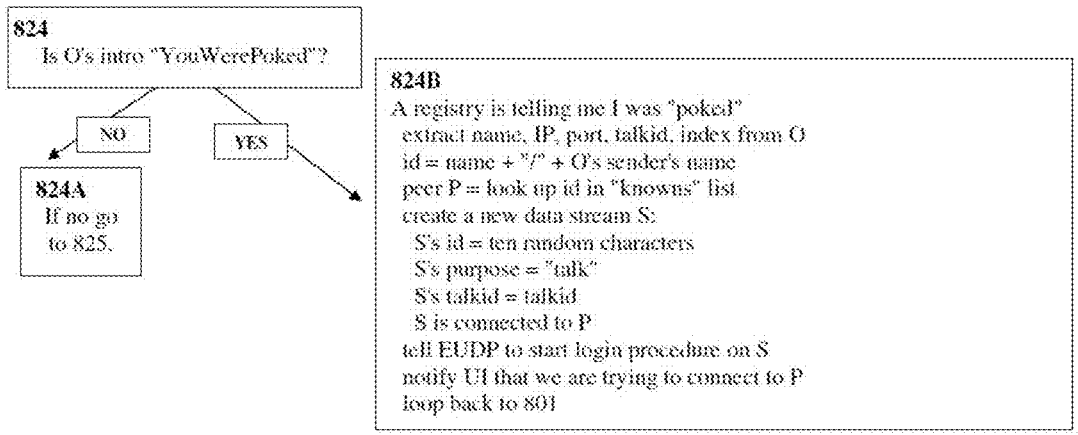

Proceeding to FIG. 8O, the processing at step 824 is illustrated. When processing has branched to this step, the object is queried to see if it is tagged "YouWerePoked" and if not processing jumps to step 825 at step 824A. If so, then a registry is telling the home device it was "poked.". Protocols to perform a confirmations and create a response and make notifications at step 824B as illustrated are performed before looping back to step 801.

Figure 8P:
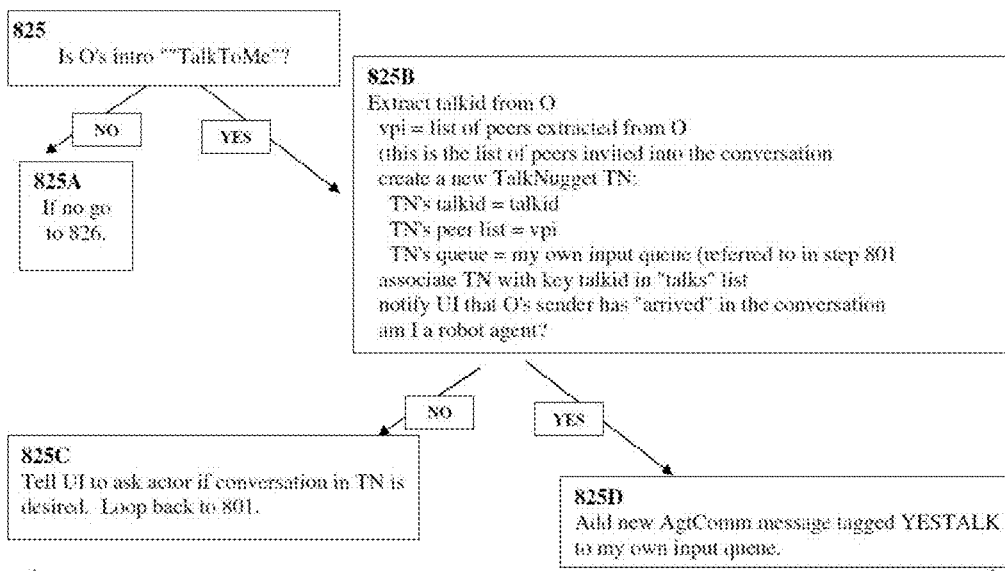

Proceeding to FIG. 8P, the processing at step 825 is illustrated. When processing has branched to this step, the object is queried to see if it is tagged "TalkToMe" and if not processing jumps to step 826 at step 825A. If so, then processing is initiated to communicate back to the sender Protocols to make notifications at step 825B as illustrated are performed. As part of the processing, the home device determines if it is a robot Agent. If it is not, then communication with the actor is initiated to determine if conversation in TN is desired before looping back to step 801. If the home device is a robot Agent then processing at step 825D adds a message YESTALK to its own queue before looping back to step 801.

Figure 8Q:
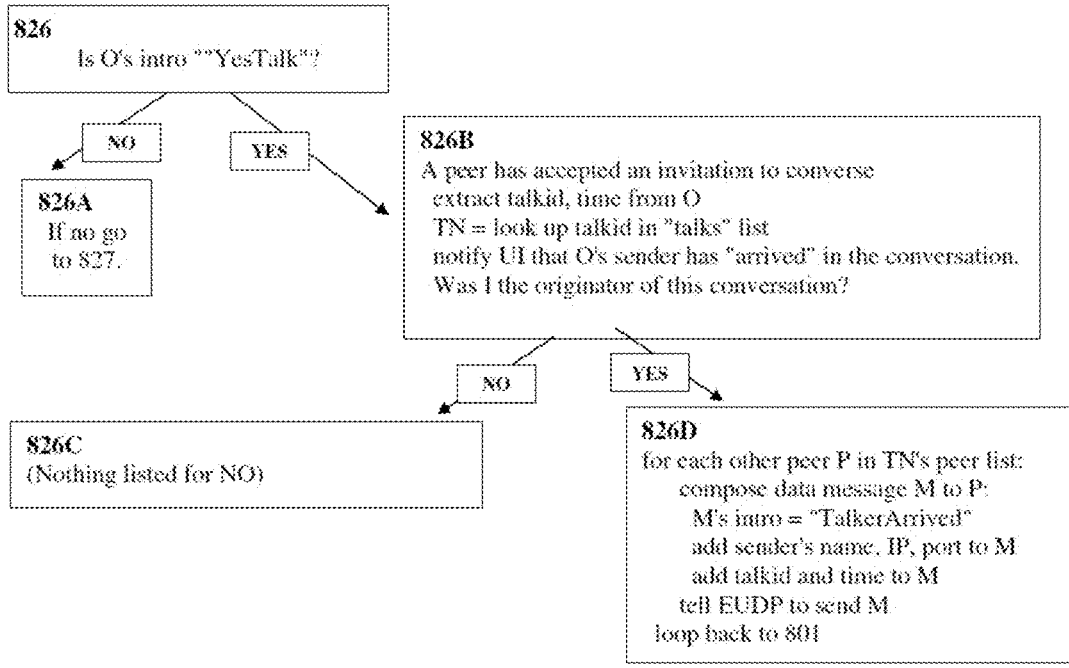

Proceeding to FIG. 8Q, the processing at step 826 is illustrated. When processing has branched to this step, the object is queried to see if it is tagged "YesTalk" and if not processing jumps to step 827 at step 826A. If so, then a peer has accepted an invitation to converse. Protocols to characterize the conversation are performed at step 826B and notifications are made before determining if the home device was the originator of the conversation. If it was, then notifications are made to each of the peers at step 826D as illustrated and then looping back to step 801 is performed.

Figure 8R:
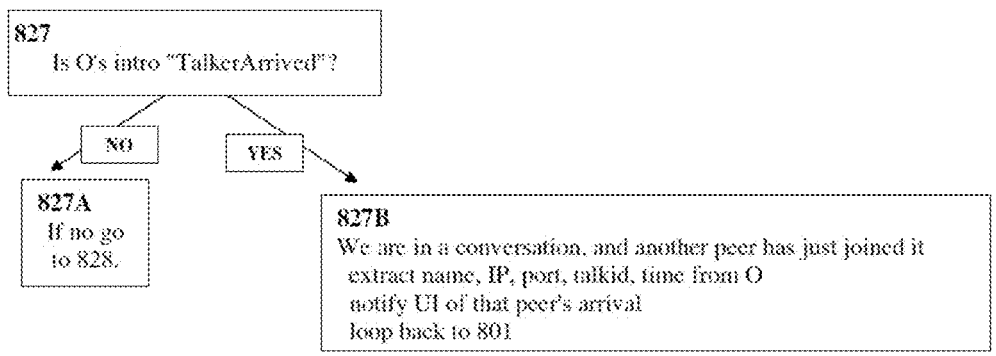

Proceeding to FIG. 8R, the processing at step 827 is illustrated. When processing has branched to this step, the object is queried to see if it is tagged "TalkerArrived" and if not processing jumps to step 828 at step 827A. If so, then conversation is occurring. Protocols to characterize the conversation are performed at step 827B and notifications are made before looping back to step 801.

Figure 8S:
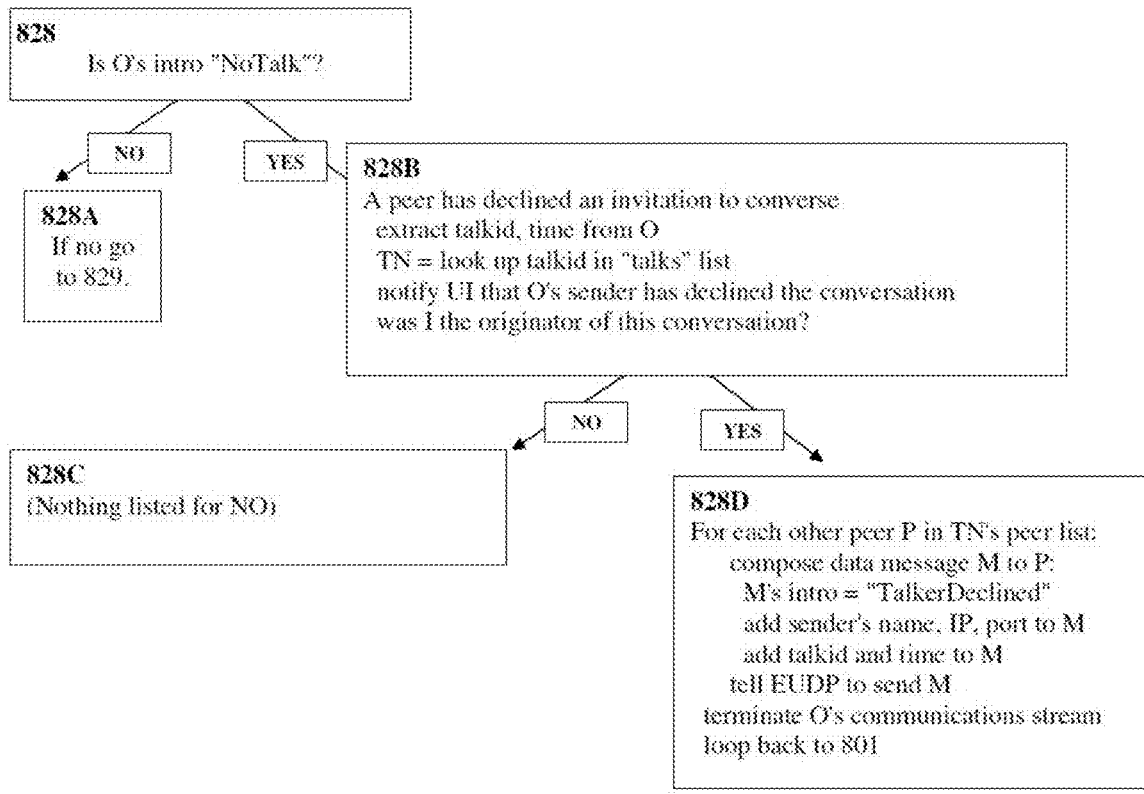

Proceeding to FIG. 8S, the processing at step 828 is illustrated. When processing has branched to this step, the object is queried to see if it is tagged "NoTalk" and if not processing jumps to step 829 at step 828A. If so, then a peer has declined an invitation to converse. Protocols to characterize the conversation are performed at step 828B and notifications are made before determining if the home device was the originator of the conversation. If it was, then notifications are made to each of the peers at step 828D as illustrated and then looping back to step 801 is performed.

Figure 8T:
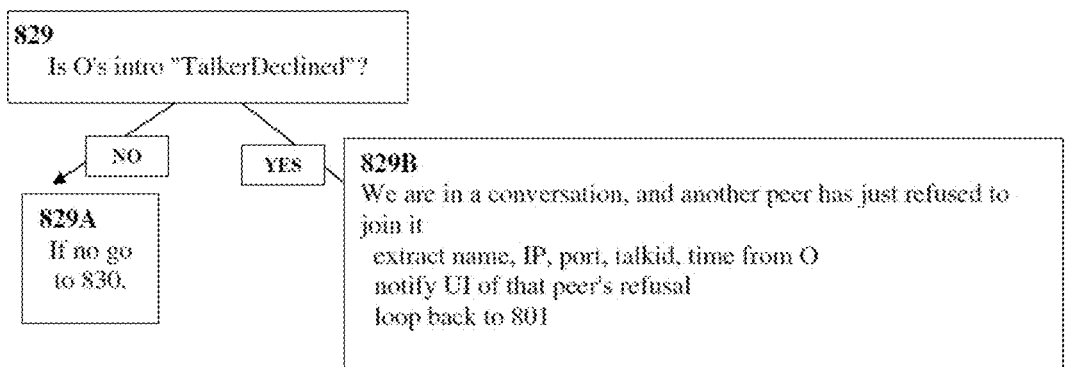

Proceeding to FIG. 8T, the processing at step 829 is illustrated. When processing has branched to this step, the object is queried to see if it is tagged "TalkerDeclined" and if not processing jumps to step 830 at step 829A. If so, then conversation is occurring and another peer has refused to join it. Protocols to characterize the conversation are performed at step 829B and notifications are made before looping back to step 801.

Figure 8U:
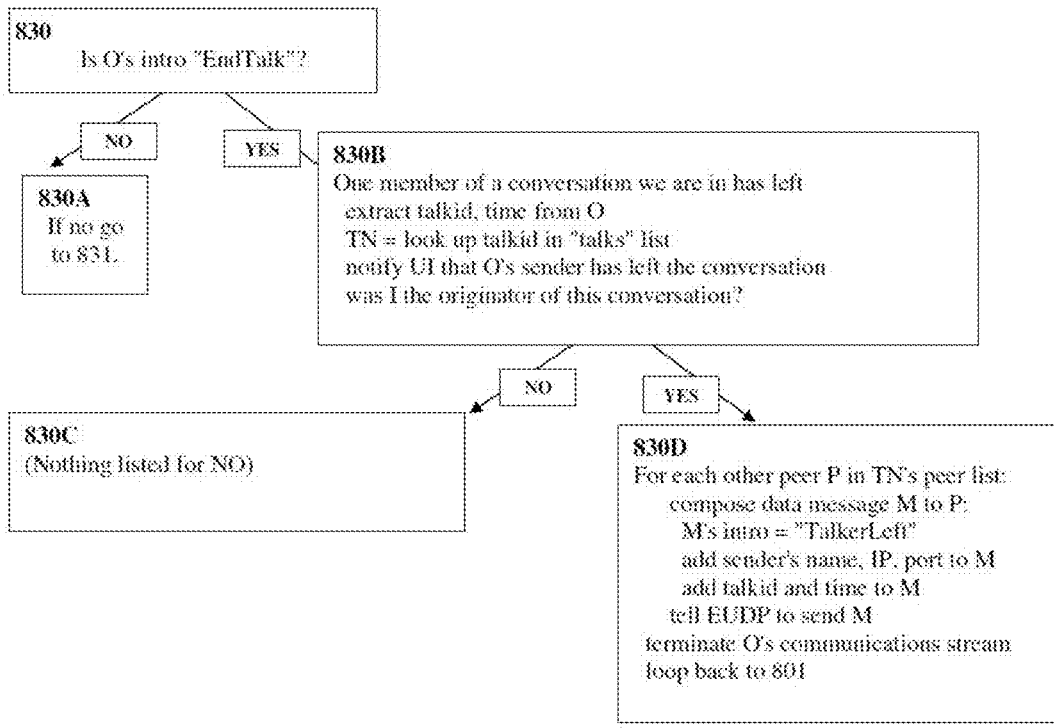

Proceeding to FIG. 8U, the processing at step 830 is illustrated. When processing has branched to this step, the object is queried to see if it is tagged "EndTalk" and if not processing jumps to step 831 at step 830A. If so, then a member of the conversation has left. Protocols to characterize the conversation are performed at step 830B and notifications are made before determining if the home device was the originator of the conversation. If it was, then notifications are made to each of the peers at step 830D as illustrated and then looping back to step 801 is performed.

Figure 8V:
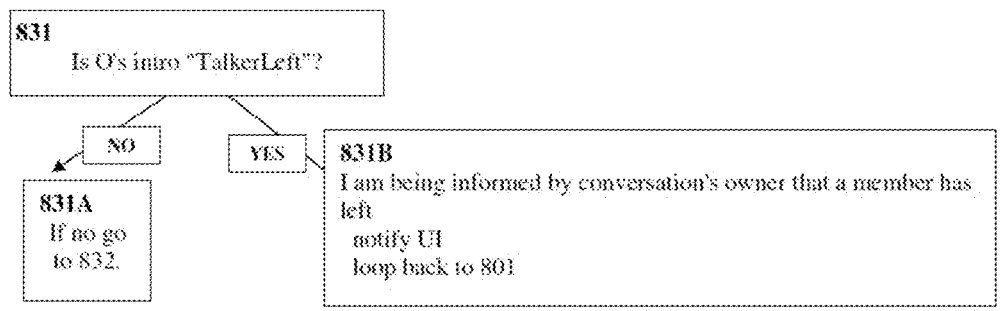

Proceeding to FIG. 8V, the processing at step 831 is illustrated. When processing has branched to this step, the object is queried to see if it is tagged "TalkerLeft" and if not processing jumps to step 832 at step 831A. If so, then conversation is occurring and another peer has left and a peer is informing on this fact. Protocols for notifications are made before looping back to step 801.

Figure 8W:
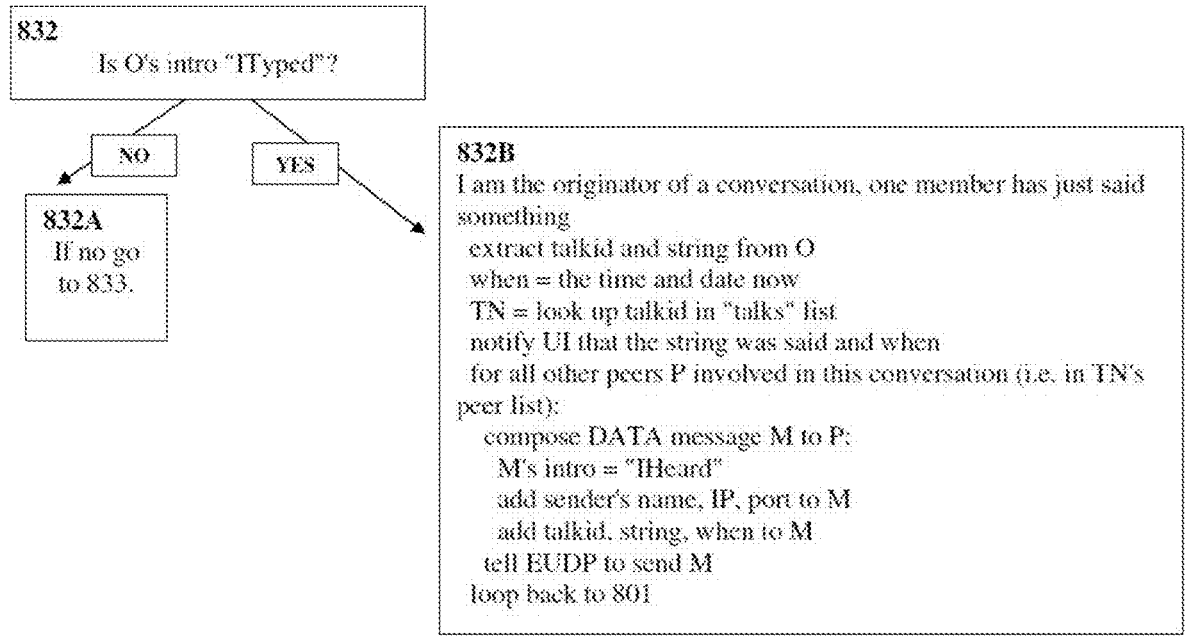

Proceeding to FIG. 8W, the processing at step 832 is illustrated. When processing has branched to this step, the object is queried to see if it is tagged "ITyped" and if not processing jumps to step 833 at step 832A. If so, then conversation is occurring that the home device originated and another member has just communicated. Protocols to characterize the conversation are performed at step 832B and notifications are made before looping back to step 801.

Figure 8X:
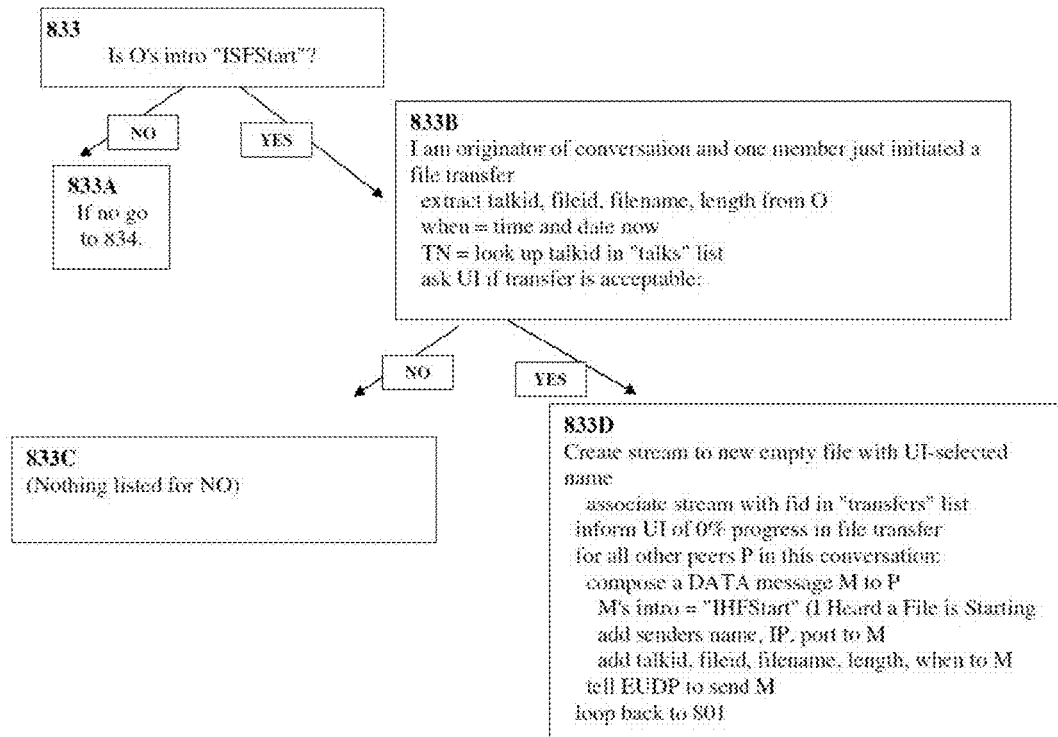

Proceeding to FIG. 8X, the processing at step 833 is illustrated. When processing has branched to this step, the object is queried to see if it is tagged "ISFStart" and if not processing jumps to step 834 at step 833A. If so, then the home device is the originator of the conversation and a member just initiated a file transfer. Protocols to characterize the conversation are performed at step 830B and notifications are made before determining if transfer of file is acceptable. If it was, then a stream is initiated and notifications are made to at step 833D as illustrated and then looping back to step 801 is performed.

Figure 8Y:
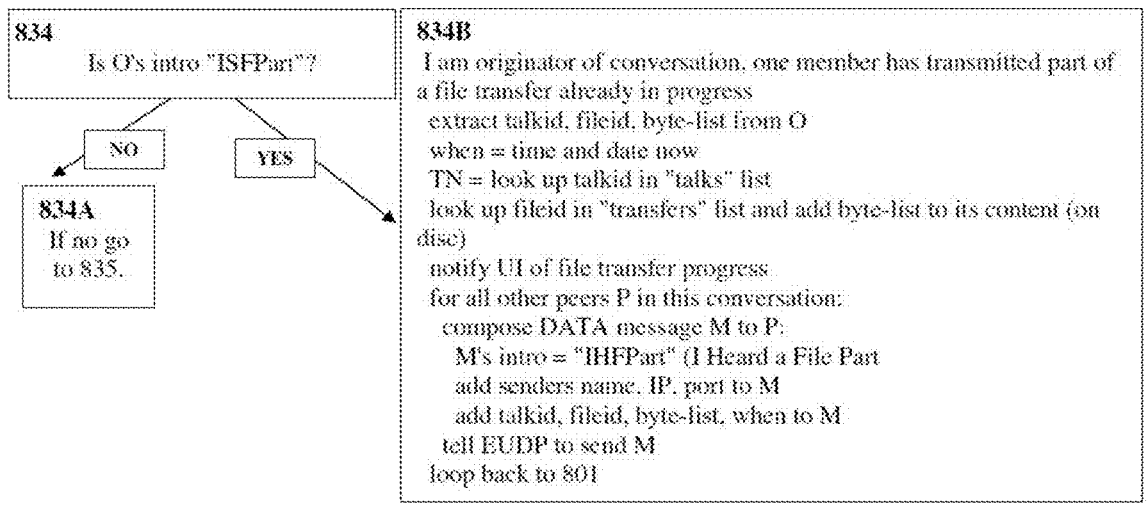

Proceeding to FIG. 8Y, the processing at step 834 is illustrated. When processing has branched to this step, the object is queried to see if it is tagged "ISFpart" and if not processing jumps to step 835 at step 834A. If so, then conversation is occurring that the home device originated and another member has transmitted part of a file transfer. Protocols to characterize the conversation are performed at step 834B and notifications are made before looping back to step 801.

Figure 8Z:
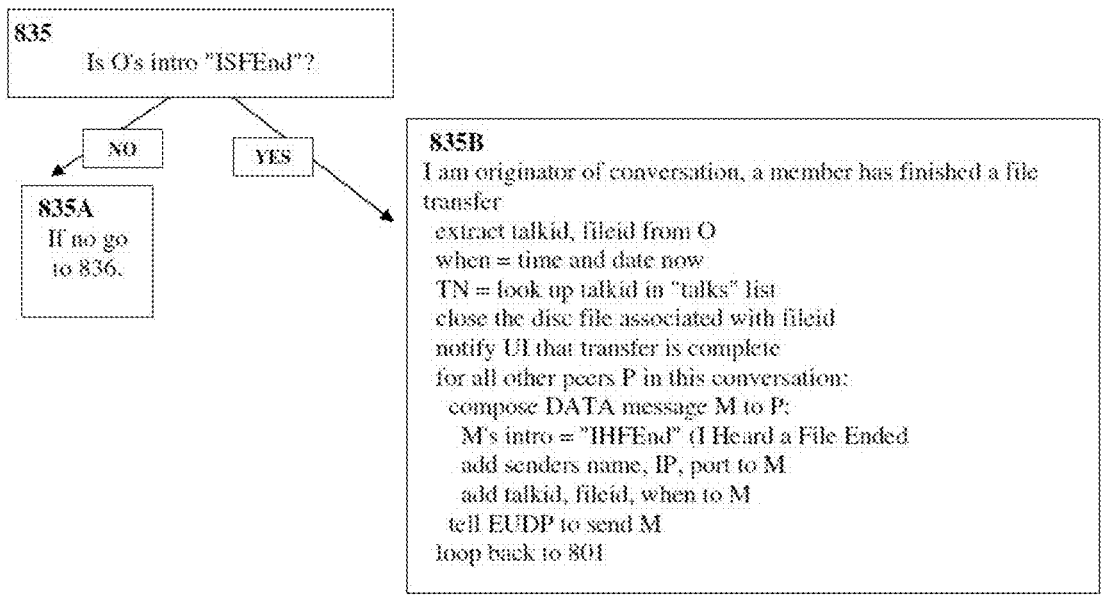
Figure 8A:
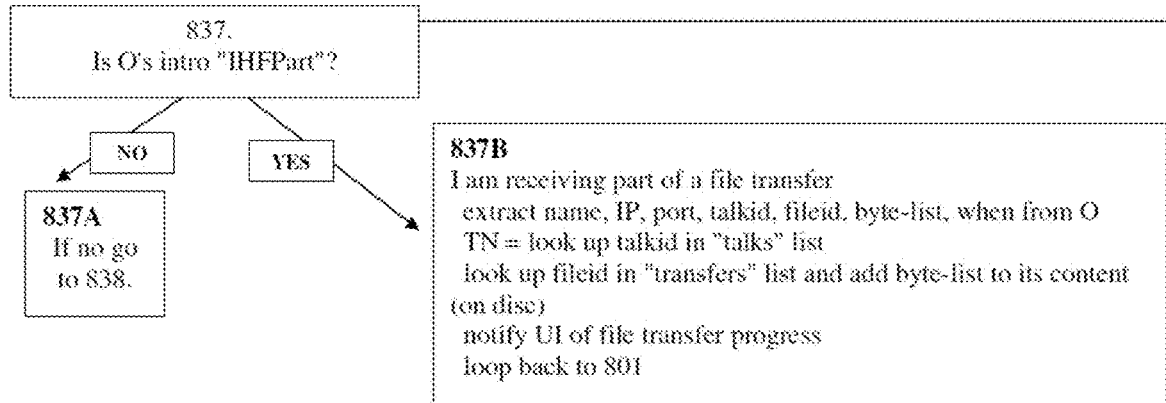
Figure 8A:
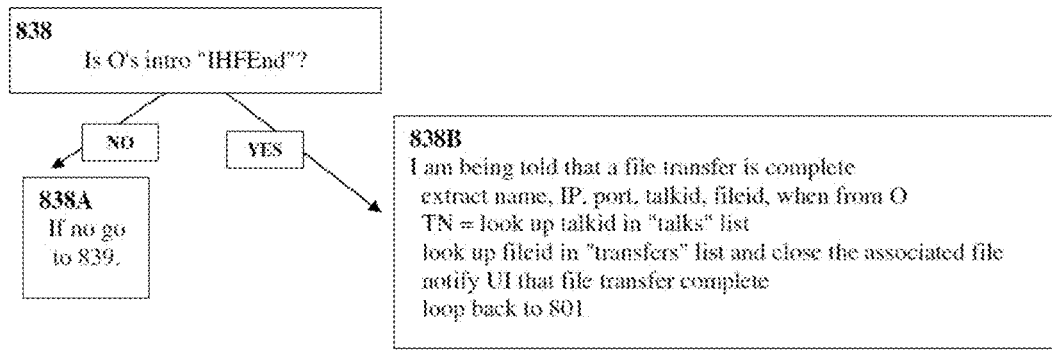
Figure 8A:
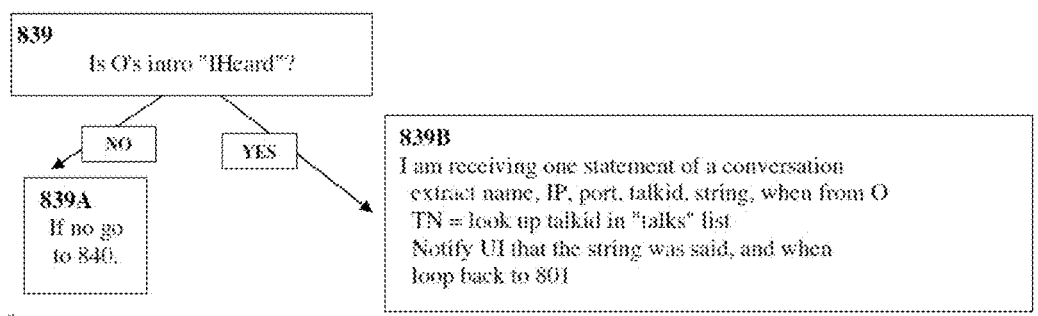
Figure 8A:
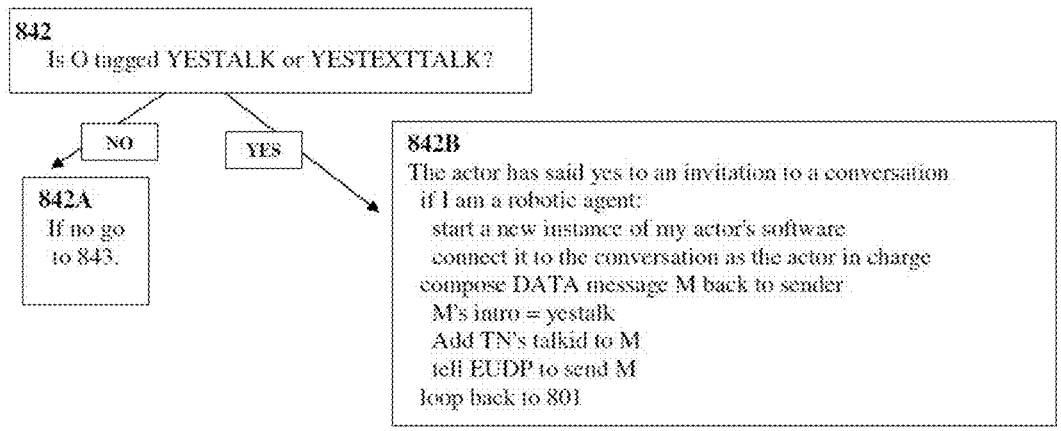
Figure 8A:
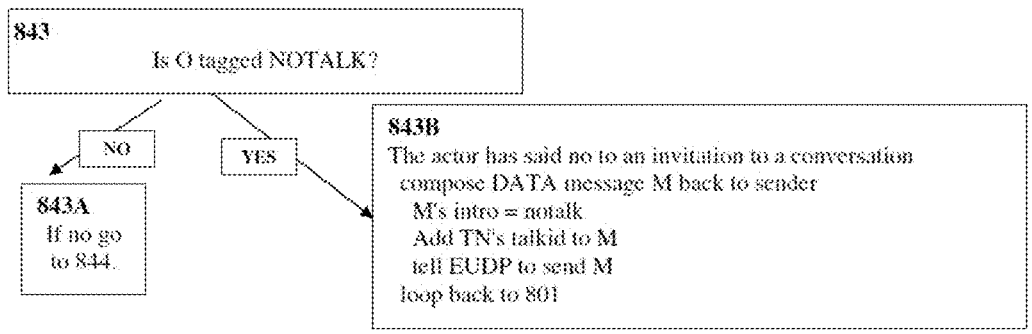
Figure 8A:
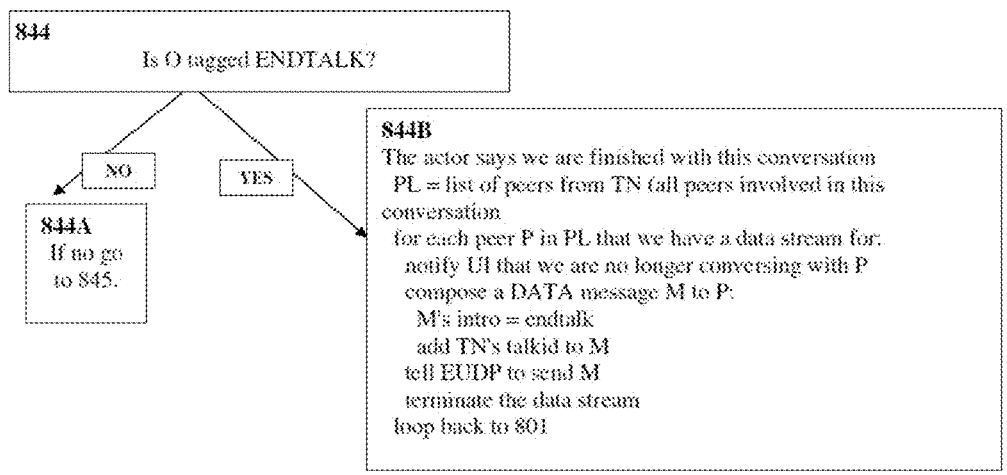
Figure 8A:
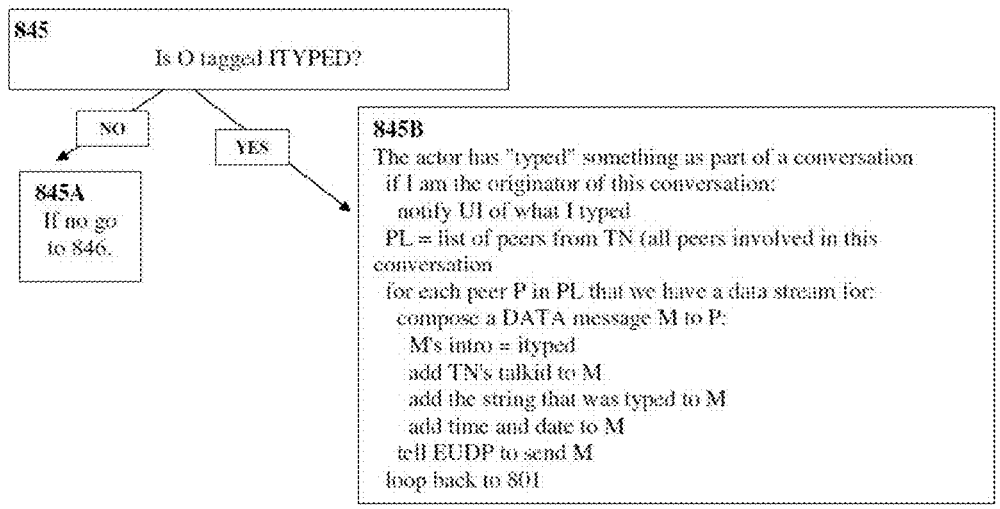
Figure 8A:
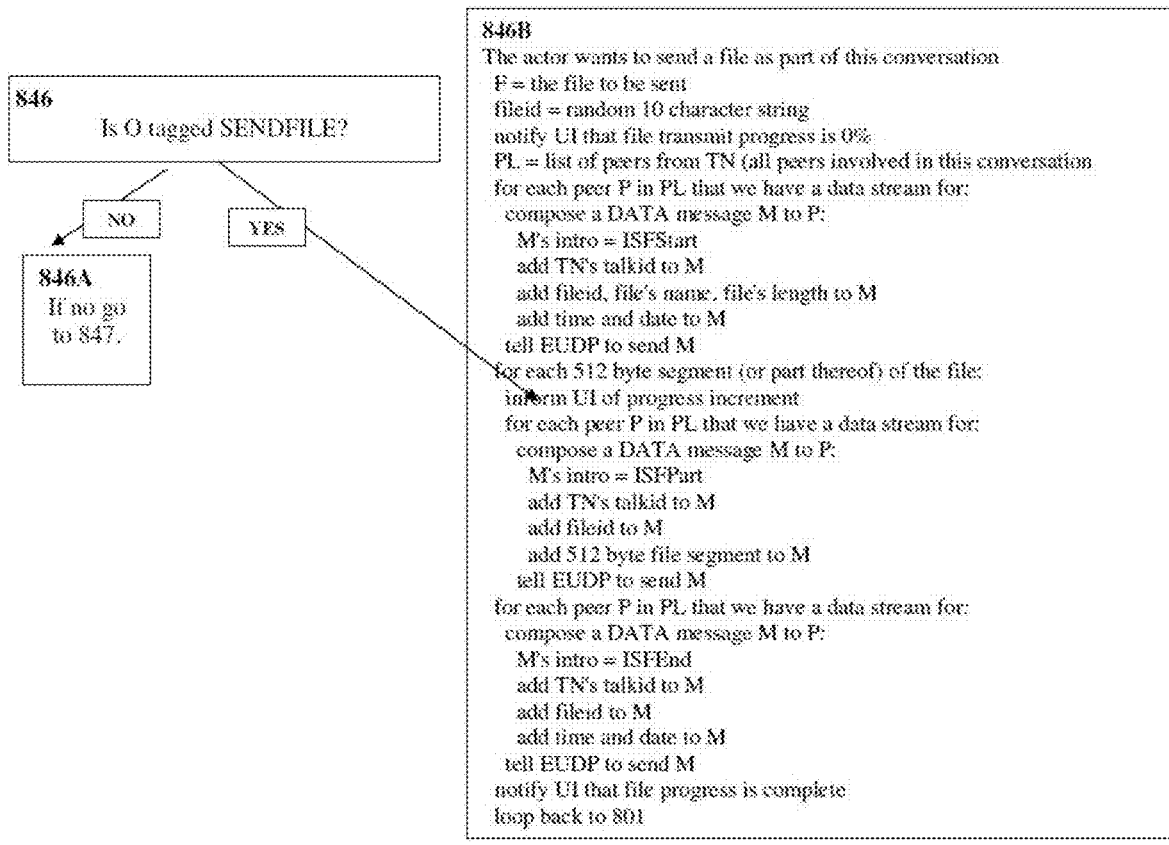

Proceeding to FIG. 8Z, the processing at step 835 is illustrated. When processing has branched to this step, the object is queried to see if it is tagged "ISFEnd" and if not processing jumps to step 836 at step 835A. If so, then conversation is occurring that the home device originated and another member has finished transmitting a file transfer. Protocols to characterize the conversation are performed at step 835B and notifications are made before looping back to step 801.

Proceeding to FIG. 8AA, the processing at step 837 is illustrated. When processing has branched to this step, the object is queried to see if it is tagged "IHFPart" and if not processing jumps to step 838 at step 837A. If so, then the home device is receiving a file transfer. Protocols to characterize the conversation and transfer are performed at step 837B and notifications are made before looping back to step 801.

Proceeding to FIG. 8AB, the processing at step 838 is illustrated. When processing has branched to this step, the object is queried to see if it is tagged "IHFEnd" and if not processing jumps to step 839 at step 838A. If so, then the home device is told that a file transfer is complete. Protocols to characterize the conversation and transfer are performed at step 838B and notifications are made before looping back to step 801.

Proceeding to FIG. 8AC, the processing at step 839 is illustrated. When processing has branched to this step, the object is queried to see if it is tagged "IHeard" and if not processing jumps to step 840 at step 839A. If so, then the home device is told that it is receiving one statement of a conversation. Protocols to characterize the conversation are performed at step 839B and notifications are made before looping back to step 801.

Proceeding to FIG. 8AD, the processing at step 840 is illustrated. When processing has branched to this step, there has been an error to be reported. Protocols to report the error are performed before looping back to step 801.

Proceeding to FIG. 8AE, the processing at step 841 is illustrated. When processing has branched to this step, the object is queried to see if it is an AgtComm object and if not processing jumps to step 848 at step 841A. If so, then the actor has done something that must be reacted to. The home device extracts information from the conversation and determines if the object is tagged TalkTo or TEXTTALKTO at step 741B. If not then processing jumps to step 842 at step 841C. If it is tagged in these manners then the actor wants to start a conversation with another peer. Protocols to communicate are performed at step 841D and notifications are made before looping back to step 801.

Proceeding to FIG. 8AF, the processing at step 842 is illustrated. When processing has branched to this step, the object is queried to see if it is tagged "YESTALK" or "YESTEXTTALK" and if not processing jumps to step 843 at step 842A. If so, then the actor has said yes to an invitation to a conversation. Protocols to initiate the conversation are performed at step 842B and notifications are made before looping back to step 801.

Proceeding to FIG. 8AG, the processing at step 843 is illustrated. When processing has branched to this step, the object is queried to see if it is tagged "NOTALK" and if not processing jumps to step 844 at step 842A. If so, then the actor has said no to an invitation to a conversation. Protocols to compose a message are performed at step 843B and notifications are made before looping back to step 801.

Proceeding to FIG. 8AH, the processing at step 844 is illustrated. When processing has branched to this step, the object is queried to see if it is tagged "ENDTALK" and if not processing jumps to step 845 at step 844A. If so, then the actor has said the conversation has finished. Protocols to initiate the communicate the status to peers and terminate data streams are performed at step 844B and notifications are made before looping back to step 801.

Proceeding to FIG. 8AI, the processing at step 845 is illustrated. When processing has branched to this step, the object is queried to see if it is tagged "ITYPED" and if not processing jumps to step 846 at step 845A. If so, then the actor has typed something as part of a conversation. Protocols to initiate the conversation are performed at step 845B and notifications are made before looping back to step 801.

Proceeding to FIG. 8AJ, the processing at step 846 is illustrated. When processing has branched to this step, the object is queried to see if it is tagged "SENDFILE" and if not processing jumps to step 847 at step 846A. If so, then the actor is requesting to send a file as part of this conversation. Protocols to initiate the file transfer and communications are performed at step 846B as illustrated and notifications are made before looping back to step 801.

Proceeding to FIG. 8AK, an error of unrecognized Agt-Comm message is communicated at step 847 before looping back to step 801.

Proceeding to FIG. 8AL, the processing at step 848 is illustrated. When processing has branched to this step, the object is queried to see if it is a GUIEvent object and if not processing jumps to step 849 at step 848A. If so, then the close control at the top right of the main window has been selected. Protocols to remove the GUI and shut down the system are performed at step 848B and then processing EXITS.

Proceeding to FIG. 8AM, an error of unrecognized GUIEvent message is communicated at step 849 before looping back to step 801.

Proceeding to FIG. 8AN, an error of unrecognized message format is communicated at step 850 before looping back to step 801.

Behavior of the Extended UDP Component

Proceeding to FIGS. 9A through 9X the various operations of the extended UDP component of the PeN type are illustrated in exemplary form. Details of the various protocols are provided in some detail in the figures, while a summary of the function is discussed herein. A Pen may be created as a non-secure communications and then be transitioned into a secure communications channel via the process steps described in 9A through 9X.

Starting with FIG. 9A, a protocol may initiate at step 900 and create a new queue of messages and other initiation steps before jumping to a loop protocol at step 902 (e.g. by setting an incrementer value to an original state, such as i=o). Continuing to FIG. 9B the protocol for initiating login on stream "s". Continuing further to FIG. 9C, general operational protocol are defined. At step 902 an initiation protocol is defined.

At step 903, in FIG. 9D, various processing of streams and associated branching instructions are performed as illustrated.

At step 905, in FIG. 9E, a generic increment operation is defined followed by looping to step 903. At step 906, in FIG. 9F, processing for the case where a response to a previously sent message is overdue is performed as illustrated followed by looping to step 902. Continuing step 907, FIG. 9G, processing for the case where a message of the object is to be sent is performed as illustrated followed by branching to step 908.

Proceeding to step 908 in FIG. 9H, a protocol for when the queue of incoming packets from UDP is not empty is performed as illustrated followed by looping to step 902. Control loops back to step 902. In FIG. 9I, at step 909, protocols for dealing with a packet of data that arrived via UDP is illustrated. Control loops back to step 902. In FIG. 9J, at step 910, protocols for dealing with a non-Hello1 message which was received on a previously non-existent stream are illustrated. Control loops back to step 902.

Figure 9K:
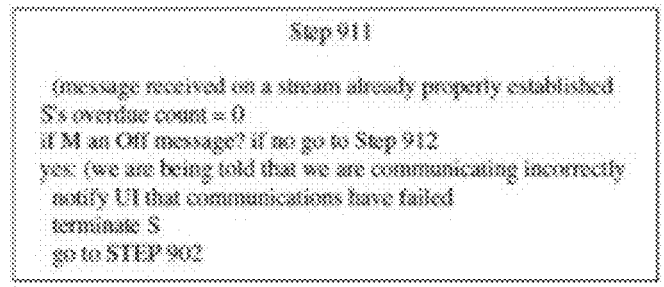
FIGS. 9A-9X illustrate additional method steps that may be included in embodiments of the present invention.
Figure 9L:
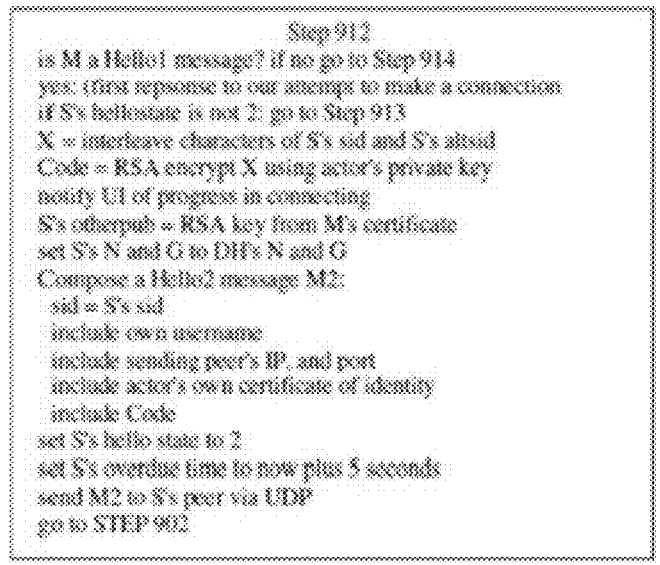
Figure 9M:
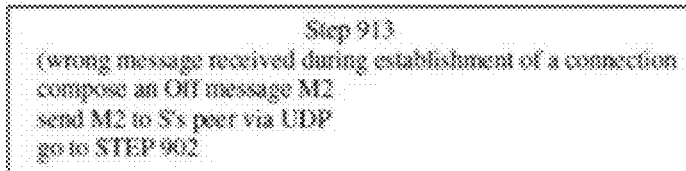

Continuing to step 911, in FIG. 9K, a protocol for dealing with a message received on a stream already properly established is provided in the illustration before the protocol loops back to step 902. At step 912, in FIG. 9L a protocol for dealing with the message being various types of Hello type messages is provided with various branch points to other steps. For processing that proceeds through the entire protocol at step 912 then control loops back to step 902. Step 913 in FIG. 9M next illustrates handling of an incorrect message communication during establishment of a connection with the ability to notify the peer user before looping back to step 902. Similarly steps 914, 915, 916, 917, 918, 919 and 920 (which correspond to the FIGS. 9N-9T) are protocols to handle various hello messages as illustrated from the branch points of step 912 and other step branch points. Various communications during these protocols may invoke encryption of the messages. For these steps, when control proceeds through the entire protocol, as in step 912 control loops back to step 902.

Referring to step 921 in FIG. 9U, a comparison of the type of message is made to understand if it is a data message and if not control branches to step 922. If it is a message than various control comparisons related to sequencing, novelty and encryption are processed while looping back to step 902 thereafter. When processing proceeds to step 922, as illustrated in FIG. 9V, the message is compared to an ACK message and if it is not one, the control branches to step 923. If it is an ACK message, comparisons relating to sequencing and determining if communication is integral are made with notifications prepared before looping back to step 902.

Proceeding to step 923, in FIG. 9W, a comparison of the type of message is made to understand if the message is a NACK message and if not control branches to step 924. If it is a NACK message notifications of bad communications are performed before looping back to step 902.

Finally, in FIG. 9X, the message comparison ends by comparing the message type to a PING message. If the control has come to this step and the message is not a ping message the control reverts to looping back to step 902 without any further processing as there is no alternative left. If there is a PING message, then state comparisons are made and as appropriate notifications and state variable setting is performed before looping back to step 902.

Figure 10A:
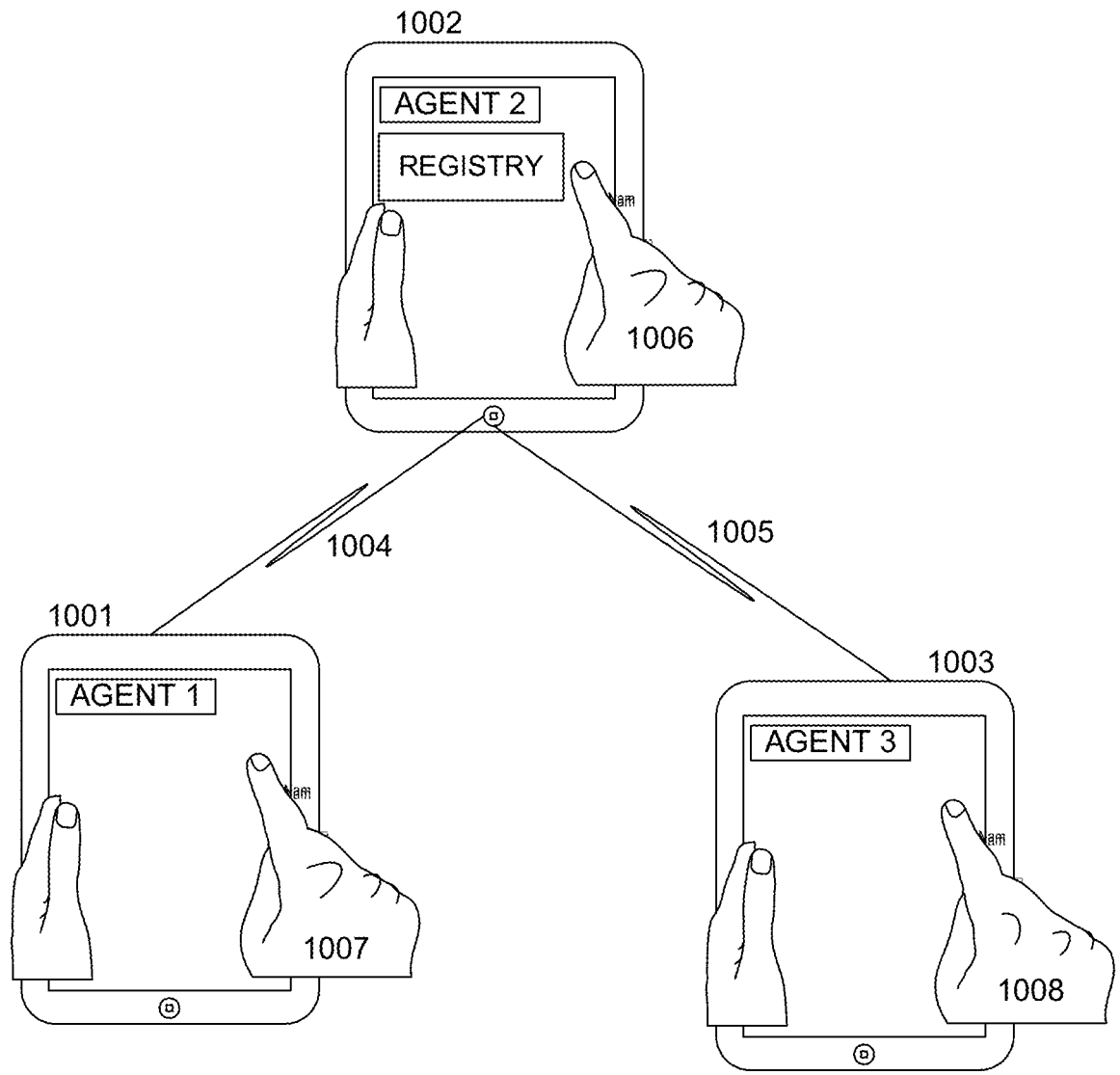
FIGS. 10A-10B illustrate devices and configurations that may be used in some embodiments of the present invention.

Referring now to FIG. 10A, according to the present invention, a logical communications network via communications channels 1004 1005 between Agents as shown. A series of communications may commerce via transmitting a first communication from a first Agent 1001 to a second Agent 1002, the first communication typically includes a request from the first Agent 1001 to communicate directly with a third Agent 1003. The first Agent 1001 will request that the second Agent 1002 access a registry of Agents and communicate with a particular IP address and port number associated with the third Agent 1003 in the registry.

The second Agent 1002 accesses the registry to transmit a communication from the second Agent 1002 to the third Agent 1003, the communication from the second Agent 1002 to the third Agent 1003 includes an indication that the first Agent 1001 has requested to communicate directly with the third Agent 1003. The communication from the second Agent 1002 to the third Agent 1003 also includes logic details for enabling direct communication between the third Agent 1003 and the first Agent 1001. Logic details typically include a unique locating scheme, such as an IP address in combination with a port with which an Agent may be communicated.

Figure 10B:
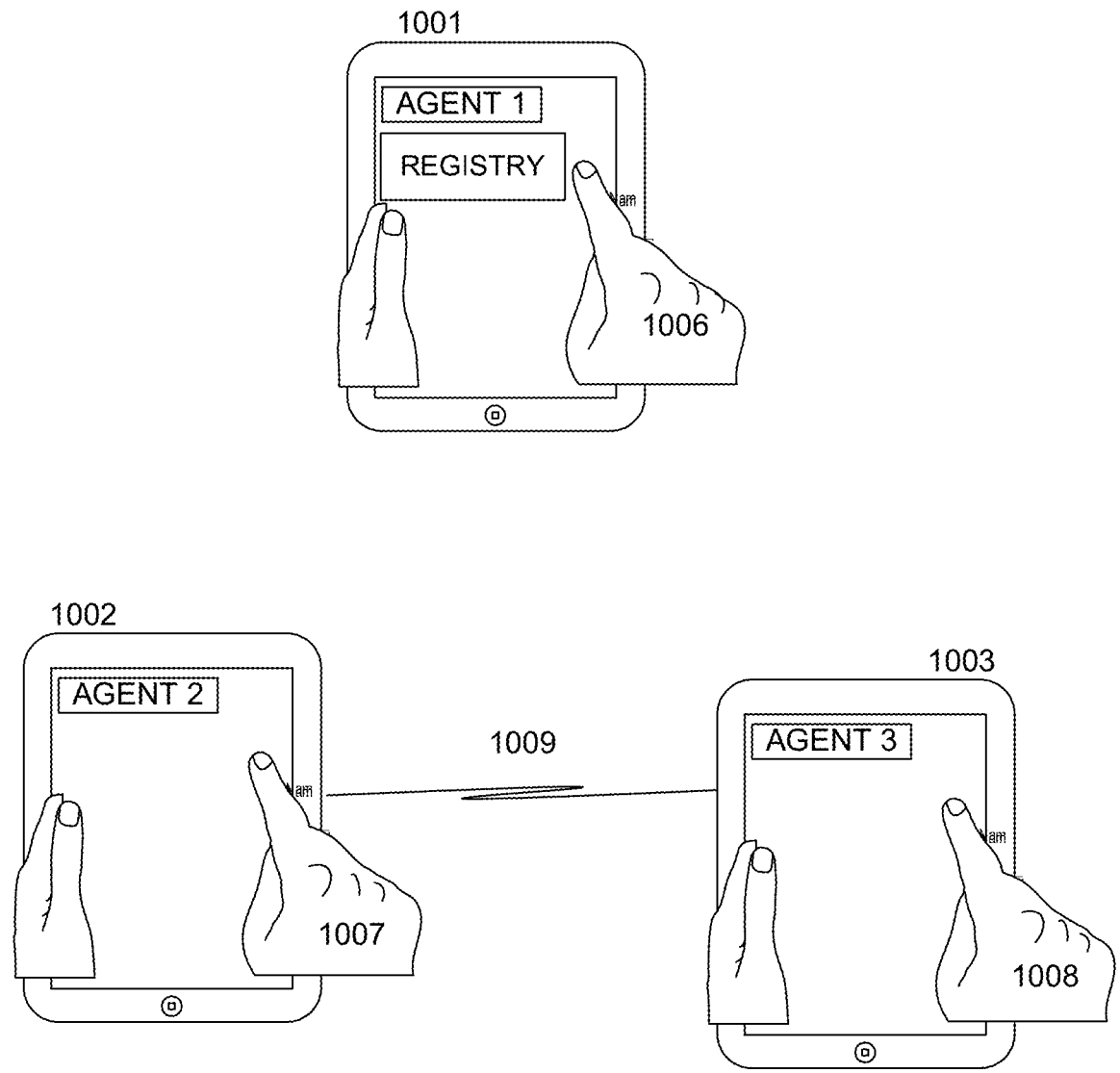

Referring now to FIG. 10B, an electronic communications channel 1004 may be established between the first Agent 1001 and the third Agent 1003 via the electronic communications network, wherein the electronic communications channel 1004 is established via reference to the logic details transmitted from the second Agent 1002 to a third Agent 1003 and wherein the logical communications channel does not include the second Agent 1002.

One or more communications may be made between the first Agent 1001 and the third Agent 1003 via the logical communication channel 1009 established between the first Agent 1001 and the third Agent 1003.

Agents 1001-1003 may include digital storage. The digital storage may an Internet Protocol address (IP address) and a port designation associated with a registry. The IP address and port designation may be accessed in order to direct a first communication to the registry holder, which in the illustrated scenario is the second Agent 1002.

Similarly, the second Agent 1002 comprises a second digital storage medium associated with the registry, the registry will store in the second digital storage medium an Internet Protocol address and a port designation for each respective Agent, including in the illustrated example, an IP address and port designation associated with the third Agent 1003. One or more communications may be sent to the IP address and port designation for the third Agent after referencing the registry to obtain them.

In some embodiments, the second Agent 1002 may include in the registry a list of all available Agents currently available via the communications network. The registry may be stored in the second storage.

The first Agent 1001 and the third Agent 1003 may be placed in logical communication via the communications channel 1009 based upon the respective IP address and port numbers associated with the first Agent 1001 and the third Agent 1003.

Generally, it is an actor that selects a transaction between a first Agent 1001 and the third Agent 1003. An actor may be a person (as illustrated) or an automation, such as a smart appliance or an automobile or other motor vehicle; or a mobile smart device, such as an iOS phone and/or tablet; or an Android phone and/or tablet.

In some embodiments, logic commands may cause at least one of the first Agent 1001 and the third Agent 1003 to disengage from logical communication with the communications network upon completion of the actor selected transaction. An actor 1006-1008 may also cause an Agent 1001-1003 to disengage from the communications network.

As discussed above, an actor may be: a person; a smart home appliance, a smart home sensor, a motor vehicle or a software bot. Each actor is capable of commencing an action via interaction with an interface. A human actor will interface with a human readable interface, such as a graphical user interface. An automation will interact with a machine interface. An actor may also use the communication channel 1009 to operate a resource that include a machine interface that controls a machine remote from the first Agent 1001. For example, the first Agent 1001 may use communications with the third Agent 1003 to access a resource that includes a machine interface that is capable of controlling a smart home appliance, such as a refrigerator or a dishwasher or a hme heating and air conditioning unit.

In some embodiments, an actor selected transaction includes sending a text message from a first Internet Protocol address and a first port to a second Internet Protocol address and a second port. The text message is transmitted directly without storing the message on any server connected to the communications network and therefore much more secure and much less likely to appear in some inconvenient forum at some later time.

An actor selected transaction may also include transferring a file from the first Agent 1001 to the third Agent 1003. The file is transferred directly without storing the file on any server connected to the communications network which also provides increased security and prevents a service provider or other party from selling or otherwise distributing information related to actions of an actor. A file transfer comprises an image file, text file, video or other electronic file type.

An actor may also access a controller in a smart home appliance check a status of the smart home appliance; or access on board diagnostics in a motor vehicle.

Figure 11:
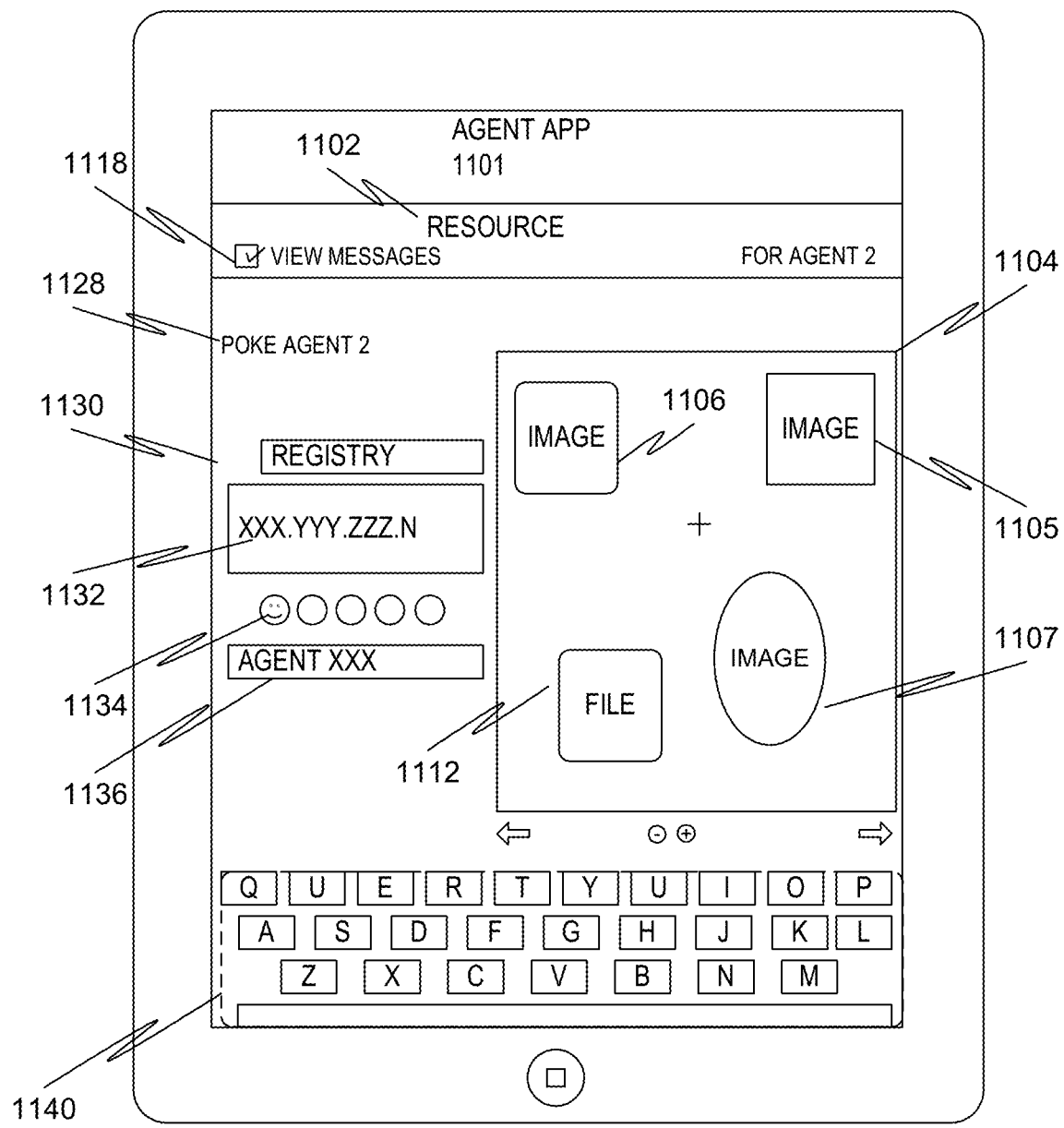
FIG. 11 illustrates an exemplary user interface that may be used in some embodiments of the present invention.

Referring now to FIG. 11, an exemplary graphical user interface is shown. It will be understood to those schooled in the art that the device interfacing with the PeN may have a machine interface instead of a graphical one; however, the elements, inputs, and outputs will be generally similar to those shown in the graphical user interface shown in FIG. 11. The interface may be displayed on agent app 1101. Agent app 1101 may display one or more elements, such as resource 1102.

Resource 1102 may include, for example, indication 1118 showing that the Agent has new messages or contact requests. Resource 1102 may also display a subject of indication 1118, such as "Agent 2." In some embodiments, resource 1102 may include a file, such as a text file or image file, located on a device associated with another Agent that the first Agent may desire. In some embodiments, resource 1102 may include a machine interface. For example, resource 1102 may correspond to a refrigerator associated with the Agent's PeN network, thus allowing Agent app 1101 to control elements of the refrigerator.

In some embodiments, the Agent may be able to query the PeN network and registry by one or more search criteria according to a resource 1102 the Agent wishes to locate. For example, the Agent may be able to search according to an Agent name, such as Agent XXX, or an Agent pseudonym, such as NotAgentXXX. The Agent may also be able to search the network according to certain other criteria associated with Agents, such as searching the network generally for "refrigerators" or "cars." Additionally, the Agent may be able to search the network for an Agent having a specific file (or a file having specific criteria, such as containing a certain string; being within a certain range of sizes; etc.), or a certain class of files (e.g., text files, images, videos, etc.). To achieve this querying ability in embodiments including a touchscreen, agent app 1101 may include a "pop-up" capacitive keyboard 1140. As described below, in some embodiments, agent app 1101 is configured to accept inputs from other user devices, such as a keyboard or a mouse.

In some embodiments, agent app 1101 may exist on a device comprising a touchscreen, or other capacitive device.

In such embodiments, an Agent or user may "tap" indication 1118 to gain more details about indication 1118. In other embodiments, the device may have other user input mechanisms, such as a mouse or a keyboard. In these embodiments, an Agent may still navigate to indication 1118 through commonly known means using these mechanisms, such as "pointing and clicking" indication 1118 with a mouse, or selecting indication 1118 with arrow keys on a keyboard and pressing a confirmation key, such as "enter." In other embodiments, an instantiation of indication 1118 will cause additional input options to appear or become otherwise available for action in agent app 1101.

Agent app 1101 may also allow additional inputs or solicitations for action in ways similar to those just described for indication 1118. For example, agent app 1101 may invite an Agent to poke 1128 a second Agent. As described here, poke 1128 has the same meaning as described in FIGS. 8K-8O.

When an action is available for an Agent (i.e., once the Agent has selected indication 1118 or initiated poke 1128, or before either of these actions), a secondary visual indicator 1104 may be displayed. As stated earlier, the present invention is not limited to devices having a graphical user interface; in machine interfaces, secondary visual indicator 1104 may be replaced by any of: a secondary menu, a secondary directory, a secondary subset of executable commands, a secondary window, or one or more textual or image strings.

Secondary visual indicator 1104 may comprise one or more images 1105-1107 which may relate to the action. For example, image 1107 may be associated with a second Agent, such as a profile picture of the second Agent. Image 1105 may comprise a picture based on a current input of a camera associated with the Agent's device or agent app 1101. Image 1106 may comprise a visual indicator associated with the action, such as an image of a finger in a poking position. In another example, where resource 1102 is a refrigerator, images 1105-1106 may comprise up and down arrows, respectively, allowing the Agent to remotely increase or decrease the temperature of the refrigerator. Of course, it is to be understood that each of these images 1105-1107 may be interchangeable, and no functionality is necessarily specifically ascribed to the placement or arrangement of each individual image 1105-1107.

Secondary visual indicator 1104 may also comprise a file 1112 associated with the action. File 1112 may be a file that the Agent or user wishes to transfer to a second Agent, such as a text file or an image. The indicator of file 1112 on the secondary visual indicator 1104 may comprise a preview of file 1112, such as a snippet of text or a thumbnail of an image. The indicator of file 1112 may also comprise functionality for choosing a different file. For example, it is commonly known in the art that on a touchscreen device, once a user chooses a file for transfer purposes (e.g., via email), frequently a small (x) will appear somewhere on the thumbnail of the file, to allow the user to delete the file from the transfer. Similar functionality may exist for the indicator of file 1112.

Agent app 1101 may also display network information, such as registry indication 1130 that agent app 1101 is connected to an applicable registry for the Agent's PeN group. Registry indication 1130 may comprise a name of the registry of the PeN group. In addition to registry indication 1130, agent app 1101 may include an IP address indicator 1132, indicating the IP address of any of: the Agent, a second Agent, or an Agent having the registry file.

Once a second Agent is chosen or connected to on the PeN network, agent app 1101 may display an identifier 1136 of the second Agent. For example, identifier 1136 of Agent XXX could simply read "Agent XXX," or it could have a name associated with Agent XXX, whether Agent XXX is a person (in which case, identifier 1136 may display the name of Agent XXX, such as "Bob," or a pseudonym, such as "NotBob123") or a machine (in which case, identifier 1136 may display a name of the machine, such as "Kitchen Refrigerator," "Downstairs Washing Machine," or "Tim's Work PC").

In addition to identifier 1136, agent app 1101 may include status indicator 1134. Once a second Agent is chosen or connected to, the first Agent may send a status, such as an emoji or other indicator of the first Agent's availability, mood, greeting, or other desired communication. Similarly, in some embodiments, status indicator 1134 may be an indicator of the second Agent's availability, mood, or other desired communication. For example, where the second Agent is a refrigerator, status indicator 1134 may be an indication of a power status, temperature, or other characteristic about the refrigerator which may be desirable to communicate.

These various steps and protocols illustrate exemplary methods that the various components of a PeN system may employ to carry out the novel aspects of communication as have been described herein. Alternatives and modifications as may be apparent are within the scope of the present disclosure.

Figure 12:
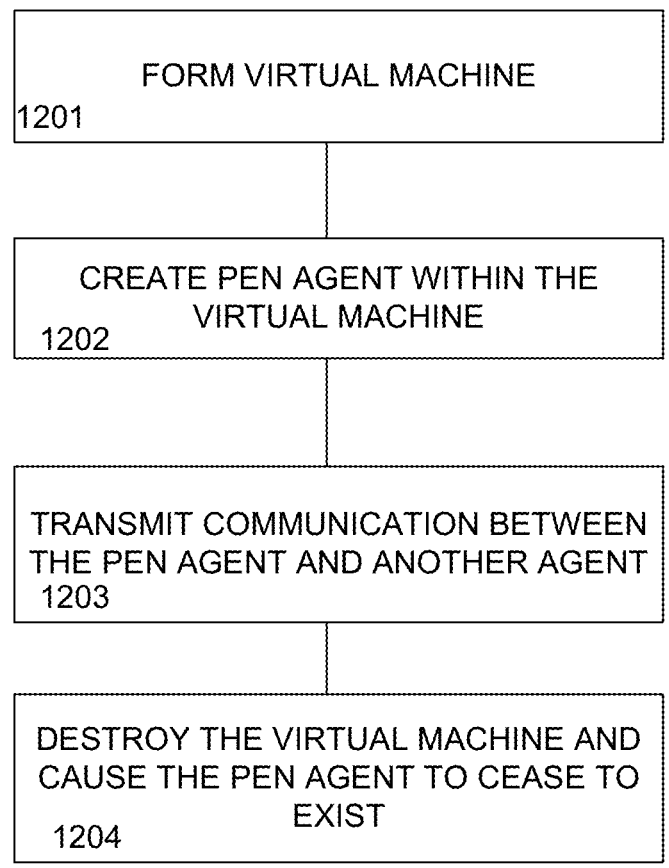
FIG. 12 illustrates exemplary process steps that may be executed in some embodiments of the present invention.

Referring now to FIG. 12, process steps are illustrated that indicate that a virtual machine may be formed at step 1201 and at 1202, a PeN Agent may be formed within the virtual machine. At step 1203, a digital communication may be transmitted between the PeN Agent and another Agent. At step 1204, the virtual machine may be destroyed thereby causing the PeN Agent to cease to exist.

CONCLUSION

A number of embodiments of the present disclosure have been described. While this specification contains many specific implementation details, there should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description thereto are not intended to limit the present disclosure to the form disclosed, but to the contrary, the present disclosure is to cover all modification, equivalents and alternatives falling within the spirit and scope of embodiments of the present disclosure as defined by the appended claims.

The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including but not limited to. To facilitate understanding, like reference numerals have been used, where possible, to designate like elements common to the figures.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted the terms "comprising", "including", and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while method steps may be depicted in the drawings in a particular order, this should not be understood as requiring that such operations be performed in the particular order shown or in a sequential order, or that all illustrated operations be performed, to achieve desirable results.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination can in some cases be excised from the combination, and the claimed combination may be directed to a sub-combination or variation of a sub-combination.

Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order show, or sequential order, to achieve desirable results. In certain implementations, multitasking and parallel processing may be advantageous. Nevertheless, it will be understood that various modifications may be made without departing from the spirit and scope of the claimed disclosure.

In certain implementations, multitasking and parallel processing may be advantageous. Nevertheless, it will be understood that various modifications may be made without departing from the spirit and scope of the claimed disclosure.

What is claimed is:

1. A method for establishing logical communication across an electronic communications network, the method comprising the steps of:
   (a) determining if a queue is empty;
   (b) determine if a datastream is purposed for registry processing;
   (c) if queue is determined to be not empty and the datastream is not purposed for registry processing, then creating a new virtual machine;
   (d) within the virtual machine, forming a virtual first personal electronic network (PeN) agent capable of electronic communication via a first Internet Protocol (IP) address and port associated with the first Pen agent and a second IP address and port associated with the second PeN agent;
   (e) transmitting via an electronic communications network, a first communication from the first PeN agent to a second PeN agent, the first communication comprising a request from the Pen agent to communicate directly with a third PeN agent;
   (f) establishing an electronic communications channel between the first PeN agent and the third agent via the electronic communications network, wherein the electronic communications channel is established via reference to logic details transmitted from the second agent to the third PeN agent and wherein the electronic communications channel does not include the second agent;
   wherein the first PeN agent comprises a first digital storage medium and the method additionally comprises the steps of:
   (g) storing in the first digital storage medium a first Internet Protocol address and a first port designation corresponding with the first PeN Agent;
   (h) associating the first Internet Protocol address and a first port designation with a registry;
   (i) transmitting the first communication to the second PeN agent via the first Internet Protocol address and a first port designation;
   wherein the second PeN agent comprises a second digital storage medium and the method additionally comprising the steps of:
   (j) storing in the second digital storage medium a second Internet Protocol address and a second port designation;
   (k) associating the second Internet Protocol address and the second port designation with the third PeN agent;
   (l) transmitting the second communication to the third agent via the second Internet Protocol address and a second port designation;
   (m) if queue is not empty then looping to step (a);
   (n) transmitting a second communication via the logical communication channel between the first PeN agent and the third PeN agent; and
   (o) following the second communication via the logical communication channel between the first PeN agent and the third PeN agent, if queue is empty, then destroying the virtual machine causing the virtual first PeN agent to cease to exist and destroying opportunity for infiltration of the logical communication channel.

2. The method of claim 1 additionally comprising the steps of transmitting via the electronic communications network, a third communication from the second PeN agent to the third PeN agent, the third communication comprising the request from the first PeN agent to communicate directly with the third PeN agent, and the logic details include a third IP address and port number for enabling direct communication between the third PeN agent and the first PeN agent and a digital certificate to authenticate the logic details.

3. The method of claim 1 wherein the second PeN Agent comprises a registry of available agents stored in the second storage.

4. The method of claim 1 additionally comprising the step of placing the first PeN agent and the third PeN agent in logical communication with the communications network.

5. The method of claim 4 additionally comprising the steps of:
commencing an actor selected transaction between the first PeN agent and the third PeN agent; and
disengaging at least one of the PeN agent and the third agent from logical communication with the communications network upon completion of the actor selected transaction.

6. The method of claim 4, additionally comprising the step of commencing an actor selected transaction between the first PeN agent and the third PeN agent.

7. The method of claim 4 additionally comprising the step of commencing an actor selected transaction between the first PeN agent and the third PeN agent, wherein the actor is a smart home appliance.

8. The method of claim 4 additionally comprising the step of commencing an actor selected transaction between the first PeN agent and the third PeN agent, wherein the actor is a software bot resident on a smart device.

9. The method of claim 7 wherein the first PeN agent exists in a virtual machine created by a controller in the smart home appliance and the second communication comprises a status of the smart home appliance.

10. The method of claim 7 wherein the first actor is a motor vehicle and the second communication comprises data made available via on board diagnostics in the motor vehicle.

11. The method of claim 8 wherein the actor selected transaction comprises sending a text message from the first Internet Protocol address and port to the third Internet Protocol address and port and the method additionally comprises the step of transmitting the text message directly from the first PeN agent to the third PeN agent without storing the message on any server connected to the communications network.

12. The method of claim 8 wherein the actor selected transaction comprises transferring a file from the first PeN agent to the third PeN agent and the method additionally comprises transferring the file directly without storing the file on any server connected to the communications network.

13. The method of claim 12 wherein the file transfer from the first PeN agent to the third PeN agent comprises an image file.

14. An agent device for conducting a communication transaction via an electronic communications network, the agent device comprising:
a controller capable of executing logical commands;
a transmitter in logical communication with the controller;
a storage medium storing logical commands as executable code that is executable upon demand to cause the controller and the transmitter to:
i. determine if a queue is empty;
ii. determine if a datastream is purposed for registry processing;
iii. if queue is determined to be not empty and the datastream is not purposed for registry processing, then create a new virtual machine;
iv. generate a first Pen agent within the virtual machine capable of electronic communication via a first Internet Protocol (IP) address and port associated with the first personal electronic network (Pen) agent and a second IP address and port associated with the second PeN agent;
v. transmit via an electronic communications network, a first communication from the first PeN agent to a second PeN agent, the first communication comprising a request from the first PeN agent to communicate directly with a third PeN agent;
vi. establish an electronic communications channel between the first PeN agent and the third PeN agent via the electronic communications network, wherein the electronic communications channel is established via reference to logic details transmitted from the second agent to a third PeN agent and wherein the electronic communications channel does not include the second PeN agent; and
wherein the first PeN agent comprises a first digital storage medium and the method additionally comprises the steps of:
vii storing in the first digital storage medium a first Internet Protocol address and a first port designation corresponding with the first PeN Agent;
viii associating the first Internet Protocol address and a first port designation with a registry;
ix transmitting the first communication to the second PeN agent via the first Internet Protocol address and a first port designation;
wherein the second PeN agent comprises a second digital storage medium and the method additionally comprising the steps of:
x storing in the second digital storage medium a second Internet Protocol address and a second port designation;
xi associating the second Internet Protocol address and the second port designation with the third PeN agent;
xii transmitting the second communication to the third agent via the second Internet Protocol address and a second port designation;
xiii if queue is not empty then looping to step (i);
xiv transmit a second communication via the logical communication channel between the first PeN agent and the third PeN agent; and
xv following the second communication via the logical communication channel between the first PeN agent and the third PeN agent, if queue is empty, then destroy the virtual machine causing the virtual first PeN agent to cease to exist, and if queue is not empty then loop to step i.

15. The agent device of claim 14 additionally comprising a logic conduit between the controller and a mobile smart device.

16. The agent device of claim 14 additionally comprising a logic conduit between the controller and a smart home appliance.

17. The agent device of claim 14 additionally comprising a logic conduit between the controller and a motor vehicle.

18. An electronic device for conducting a communication transaction via an electronic communications network, the electronic device comprising:
a controller capable of executing logical commands;
a transmitter in logical communication with the controller;

a storage medium storing a registry and additionally storing logical commands as executable code that is executable upon demand to cause the controller and the transmitter to:

receive via an electronic communications network, a first communication from a first personal electronic network (PeN) agent, the first communication comprising a request from the first PeN agent to communicate directly with a second PeN agent, said first communication generated via the steps of:

(a) determining if a queue is empty;
(b) if queue is determined to be not empty, then creating a new virtual machine;
(c) within the virtual machine, forming a virtual first PeN agent capable of electronic communication between a first IP address and port and a second IP address and port, said second IP address and port associated with the controller;
(d) transmitting via an electronic communications network, a first communication from the first PeN agent to a second PeN agent, the first communication comprising a request from the Pen agent to communicate directly with a third PeN agent; and transmit a message from the second PeN agent to the first PeN agent logic details of how to establish an logical communications channel between the PeN first agent and a third PeN agent via the electronic communications network, wherein the logical communications channel does not include the electronic device or the second PeN agent wherein the first PeN agent comprises a first digital storage medium and the method additionally comprises the steps of:

(e) storing in the first digital storage medium a first Internet Protocol address and a first port designation corresponding with the first PeN Agent;
(f) associating the first Internet Protocol address and a first port designation with a registry;
(g) transmitting the first communication to the second PeN agent via the first Internet Protocol address and a first port designation;

wherein the second PeN agent comprises a second digital storage medium and the method additionally comprising the steps of:

(h) storing in the second digital storage medium a second Internet Protocol address and a second port designation;
(i) associating the second Internet Protocol address and the second port designation with the third PeN agent;
(j) transmitting the second communication to the third agent via the second Internet Protocol address and a second port designation;
(k) if queue is not empty then looping to step (a).

* * * * *